(12) United States Patent
Fan et al.

(10) Patent No.: US 11,294,209 B2
(45) Date of Patent: Apr. 5, 2022

(54) LIQUID CRYSTAL DISPLAY DEVICE

(71) Applicant: Infovision Optoelectronics (Kunshan) Co., LTD., Suzhou (CN)

(72) Inventors: Weifeng Fan, Suzhou (CN); Hsin-Chieh Lai, Suzhou (CN); Jia He, Suzhou (CN); Dalei Zhang, Suzhou (CN); Peiyang Lin, Suzhou (CN)

(73) Assignee: INFOVISION OPTOELECTRONICS (KUNSHAN) CO., LTD., Suzhou (CN)

( * ) Notice: Subject to any disclaimer, the term of this patent is extended or adjusted under 35 U.S.C. 154(b) by 0 days.

(21) Appl. No.: 17/257,297

(22) PCT Filed: Aug. 3, 2018

(86) PCT No.: PCT/CN2018/098454
§ 371 (c)(1),
(2) Date: Dec. 30, 2020

(87) PCT Pub. No.: WO2020/024244
PCT Pub. Date: Feb. 6, 2020

(65) Prior Publication Data
US 2021/0223584 A1 Jul. 22, 2021

(51) Int. Cl.
*G02F 1/13* (2006.01)
*G02F 1/133* (2006.01)
*G02F 1/1335* (2006.01)
*G02F 1/1343* (2006.01)
*G02F 1/1362* (2006.01)
(Continued)

(52) U.S. Cl.
CPC .......... *G02F 1/1323* (2013.01); *G02F 1/1368* (2013.01); *G02F 1/13306* (2013.01); *G02F 1/133514* (2013.01); *G02F 1/134309* (2013.01); *G02F 1/136286* (2013.01); *G09G 3/3677* (2013.01); *G09G 3/3688* (2013.01); *G09G 3/3696* (2013.01); *G09G 2320/0233* (2013.01);
(Continued)

(58) Field of Classification Search
CPC ............... G02F 1/1323; G02F 1/13306; G02F 1/133514; G02F 1/134309; G02F 1/136286; G02F 1/1368; G09G 3/3677; G09G 3/3688; G09G 3/3696
See application file for complete search history.

(56) References Cited

U.S. PATENT DOCUMENTS

2015/0116385 A1    4/2015 Lee et al.

FOREIGN PATENT DOCUMENTS

CN    101226722 A    7/2008
CN    101464602 A    6/2009
(Continued)

*Primary Examiner* — James A Dudek
(74) *Attorney, Agent, or Firm* — Cheng-Ju Chiang

(57) ABSTRACT

A liquid crystal display device includes a display panel with a switchable viewing angle and a driving circuit for driving the display panel. The display panel can switch between wide and narrow viewing angles. The driving circuit includes a display control unit, a viewing angle control unit, a viewing angle control voltage generating circuit, and a gamma voltage generating circuit. The viewing angle control unit is connected to the display control unit, the viewing angle control voltage generating circuit and the gamma voltage generating circuit. The display control unit is used to control the display panel to realize picture display. The viewing angle control unit is used to control the display panel to switch between wide viewing angle display and narrow viewing angle display.

15 Claims, 22 Drawing Sheets

(51) Int. Cl.
*G02F 1/1368* (2006.01)
*G09G 3/36* (2006.01)
(52) U.S. Cl.
CPC ............... *G09G 2320/0247* (2013.01); *G09G 2320/068* (2013.01)

(56) References Cited

FOREIGN PATENT DOCUMENTS

| | | |
|---|---|---|
| CN | 102419960 B | 4/2014 |
| CN | 104517576 A | 4/2015 |
| CN | 106409256 A | 2/2017 |
| CN | 106448609 A | 2/2017 |
| CN | 106847217 A | 6/2017 |
| CN | 107624168 A | 1/2018 |
| CN | 108196380 A | 6/2018 |
| KR | 10-0832289 B1 | 5/2008 |

… # LIQUID CRYSTAL DISPLAY DEVICE

CROSS REFERENCE TO RELATED APPLICATIONS

This application is a 35 U.S.C. § 371 National Phase conversion of International (PCT) Patent Application No. PCT/CN2018/098454, filed on Aug. 3, 2018. The PCT International Patent Application was filed and published in Chinese.

FIELD OF THE INVENTION

The present invention relates to the technical field of liquid crystal display, and more particularly, to a liquid crystal display device.

BACKGROUND OF THE INVENTION

Liquid crystal display (LCD) device has the advantages of being good in image quality, small in size, light in weight, low in driving voltage, low in power consumption, free of radiation, and relatively low in manufacturing cost, and occupies domination in the field of flat panel display.

A liquid crystal display device includes a display panel, a driving circuit for driving the display panel, a backlight module for providing a backlight source, and other components. The driving circuit includes a gamma voltage generating circuit to provide a plurality of gamma voltages to the source driver, so that the source driver outputs a plurality of data signals to corresponding pixel units in the display panel. Each gray level of the display panel corresponds to a gamma voltage.

With the advancement of science and technology, users have different visual requirements for sharing information and confidential information, so the display device with a single viewing angle mode can no longer meet the needs of the users. The liquid crystal display device preferably has the ability to switch between wide and narrow viewing angle modes. It uses a wide viewing angle when the users need to share information, and a narrow viewing angle when the users want to protect the displayed information.

Since the liquid crystal display device often needs to display in different display modes such as wide viewing angle mode and narrow viewing angle mode, the existing gamma voltage generating circuit can only generate a set of gamma voltages, and using a set of gamma voltages in different display modes will cause display deviation, which cannot meet the display requirements in different display modes.

In recent years, it is proposed to use a viewing angle control electrode on the side of the color filter substrate to apply a vertical electric field to the liquid crystal molecules in order to achieve switching between wide and narrow viewing angles. Referring to FIGS. 1 and 2, the liquid crystal display device includes an upper substrate 11, a lower substrate 12, and a liquid crystal layer 13 between the upper substrate 11 and the lower substrate 12. The upper substrate 11 is provided with a viewing angle control electrode 111, and the lower substrate 12 is provided with a common electrode 121 and pixel electrodes 122. As shown in FIG. 1, during a wide viewing angle display mode, the viewing angle control electrode 111 of the upper substrate 11 is not applied with voltage, and the liquid crystal display device realizes the wide viewing angle display. As shown in FIG. 2, when a narrow viewing angle display mode is required, the viewing angle control electrode 111 of the upper substrate 11 is applied with a relatively large voltage, and the liquid crystal molecules in the liquid crystal layer 13 will be affected by a vertical electric field E (as shown by the arrows in FIG. 2), and the liquid crystal display device will reduce the contrast due to light leakage to achieve a narrow viewing angle.

Since the viewing angle control electrode 111 is a plane electrode on the entire surface, that is, the entire surface of the viewing angle control electrode 111 covers all the pixel units in the display panel, when the voltage on the viewing angle control electrode 111 changes, the pixel voltage of the charged pixel electrode 122 in the charge holding state will also change due to the capacitive coupling effect, resulting in the display panel prone to problems such as mura and flicker. In order to solve these problems, the frame frequency of the display panel is usually doubled (i.e., from 60 Hz to 120 Hz) to reduce the flicker of the picture, but this will cause the driving to become special and complicated, and the logic power consumption will also increase.

SUMMARY OF THE INVENTION

An object of the present invention is to provide a liquid crystal display device, which can realize wide and narrow viewing angle switching in different occasions, to solve the problem that the existing display devices with a switchable viewing angle will have a display deviation in different display modes, and the problem of uneven display and flicker in the narrow viewing angle mode.

An embodiment of the present invention provides a liquid crystal display device including a display panel with a switchable viewing angle and a driving circuit for driving the display panel.

The driving circuit includes a display control unit, a viewing angle control unit, a viewing angle control voltage generating circuit, a gamma voltage generating circuit, a source driver and a gate driver.

The viewing angle control unit is connected to the display control unit, the viewing angle control voltage generating circuit and the gamma voltage generating circuit, the source driver is connected to the display control unit and the gamma voltage generating circuit, the gate driver is connected to the display control unit.

The viewing angle control unit is used to receive a viewing angle switching signal, the gamma voltage generating circuit is used to output gamma voltages to the source driver, the viewing angle control voltage generating circuit is used to output a DC reference voltage, a first AC control voltage, a second AC control voltage, a first DC voltage and a second DC voltage to the display panel.

When the display panel is in a wide viewing angle display mode, the gamma voltage generating circuit outputs a first group of gamma voltages to the source driver, the first AC control voltage and the second AC control voltage are inversely symmetric with respect to the DC reference voltage, and the first DC voltage and the second DC voltage are both equal to the DC reference voltage.

When the display panel is in a narrow viewing angle display mode, the gamma voltage generating circuit outputs a second group of gamma voltages to the source driver, the first AC control voltage and the second AC control voltage are inversely symmetric with respect to the DC reference voltage, the first DC voltage is lower than the DC reference voltage, and the second DC voltage is higher than the DC reference voltage.

An embodiment of the present invention provides a liquid crystal display device including a display panel with a switchable viewing angle and a driving circuit for driving the display panel.

The driving circuit includes a display control unit, a viewing angle control unit, a viewing angle control voltage generating circuit, a gamma voltage generating circuit, a source driver and a gate driver.

The viewing angle control unit is connected to the display control unit, the viewing angle control voltage generating circuit and the gamma voltage generating circuit, the source driver is connected to the display control unit and the gamma voltage generating circuit, the gate driver is connected to the display control unit.

The viewing angle control unit is used to receive a viewing angle switching signal, the gamma voltage generating circuit is used to output gamma voltages to the source driver, the viewing angle control voltage generating circuit is used to output a DC reference voltage, a first control voltage and a second control voltage to the display panel.

When the display panel is in a wide viewing angle display mode, the gamma voltage generating circuit outputs a first group of gamma voltages to the source driver, both the first control voltage and the second control voltage are DC voltages and are equal to the DC reference voltage.

When the display panel is in a narrow viewing angle display mode, the gamma voltage generating circuit outputs a second group of gamma voltages to the source driver, both the first control voltage and the second control voltage are AC voltages and are inversely symmetric with respect to the DC reference voltage.

The liquid crystal display device provided by the embodiment of the present invention can provide two groups of independent gamma voltages, and can output different groups of gamma voltages to the display panel according to different display modes (i.e., the wide viewing angle mode and the narrow viewing angle mode) of the display panel, so that the liquid crystal display device can achieve a good display effect in different display modes, and solve the problem that the display device with a switchable viewing angle will have a display deviation when using the same set of gamma voltages in different display modes.

The liquid crystal display device provided by the embodiment of the present invention is realized by transferring the voltage for controlling the viewing angle switching from the viewing angle control electrode on the color filter substrate side to the common electrode on the array substrate side, and the common electrode on the array substrate is cut into a plurality of independent common electrode strips (or common electrode blocks). When the scanning line in each row is opened, each common electrode strip (or common electrode block) is independently charged with voltage signal during scanning, thereby alleviating the problems of uneven display (i.e., mura) and flicker in the display panel due to the capacitive coupling effect, and improving the display quality. The frame frequency of the display panel can be maintained at 60 Hz, whereby the driving is simple and the power consumption is low.

DETAILED DESCRIPTION OF PREFERRED EMBODIMENTS

In order to further illustrate the technical solutions and effects adopted by the present invention to achieve the intended purpose of the present invention, the specific implementation of the present invention will be described in detail as follows with reference to the accompanying drawings and embodiments.

First Embodiment

Figure 1:
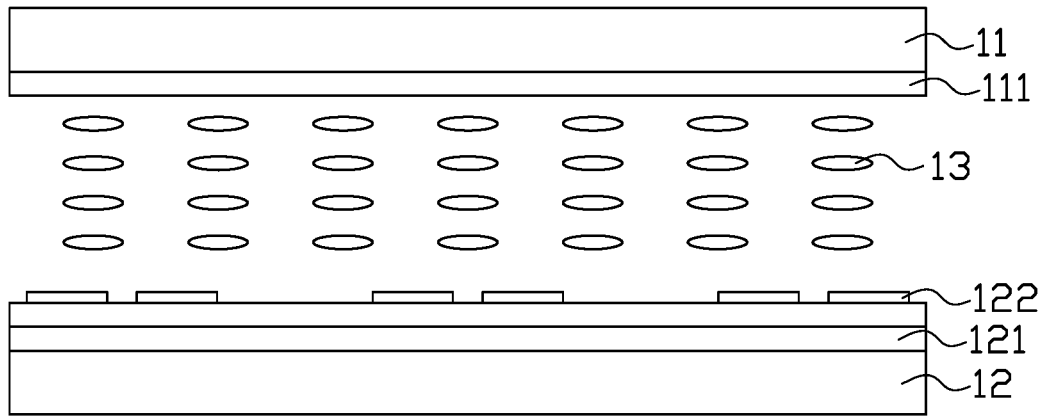
FIG. 1 is a schematic cross-sectional view of a conventional liquid crystal display device in a wide viewing angle mode.
Figure 2:
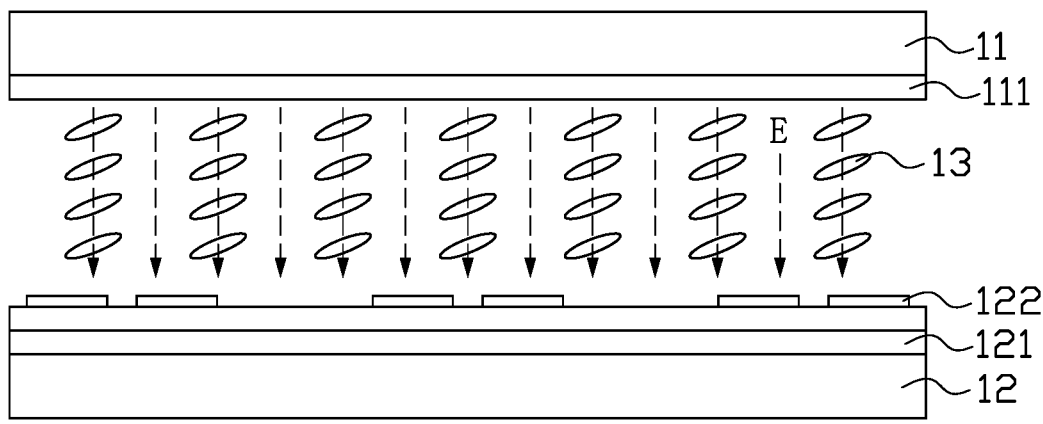
FIG. 2 is a schematic cross-sectional view of the liquid crystal display device of FIG. 1 in a narrow viewing angle mode.
Figure 3:
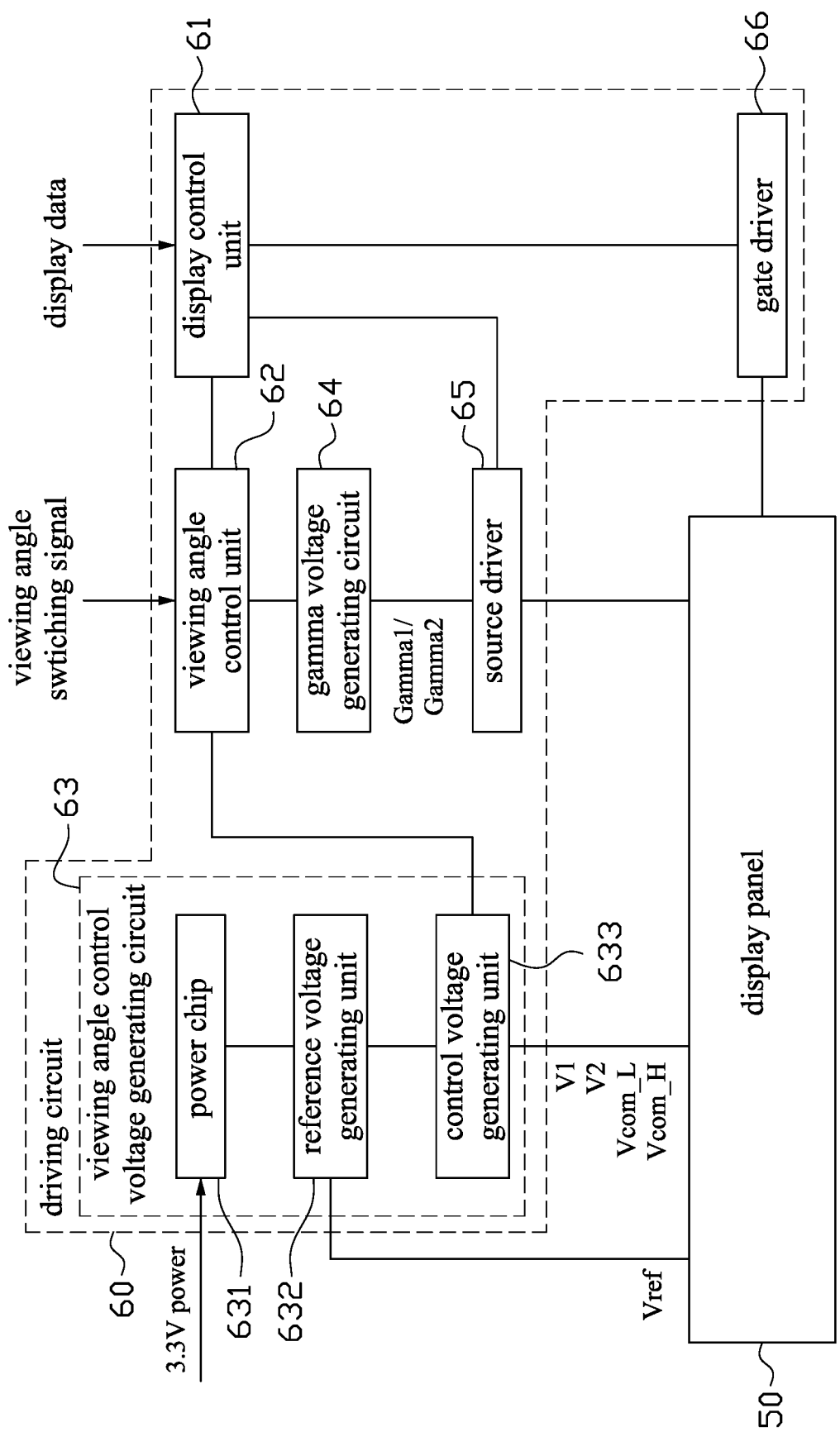
FIG. 3 is a block diagram of a liquid crystal display device according to the first embodiment of the present invention.

Referring to FIG. 3, the liquid crystal display device provided by the first embodiment of the present invention includes a display panel 50 with a switchable viewing angle, and a driving circuit 60 for driving the display panel 50. The display panel 50 can be switched between a wide viewing angle (WVA) and a narrow viewing angle (NVA). The driving circuit 60 includes a display control unit 61, a viewing angle control unit 62, a viewing angle control voltage generating circuit 63, a gamma voltage generating circuit 64, a source driver 65, and a gate driver 66. The viewing angle control unit 62 is connected to the display control unit 61, the viewing angle control voltage generating circuit 63 and the gamma voltage generating circuit 64. The source driver 65 is connected to the display control unit 61 and the gamma voltage generating circuit 64, and the gate driver 66 is connected to the display control unit 61.

Figure 4:
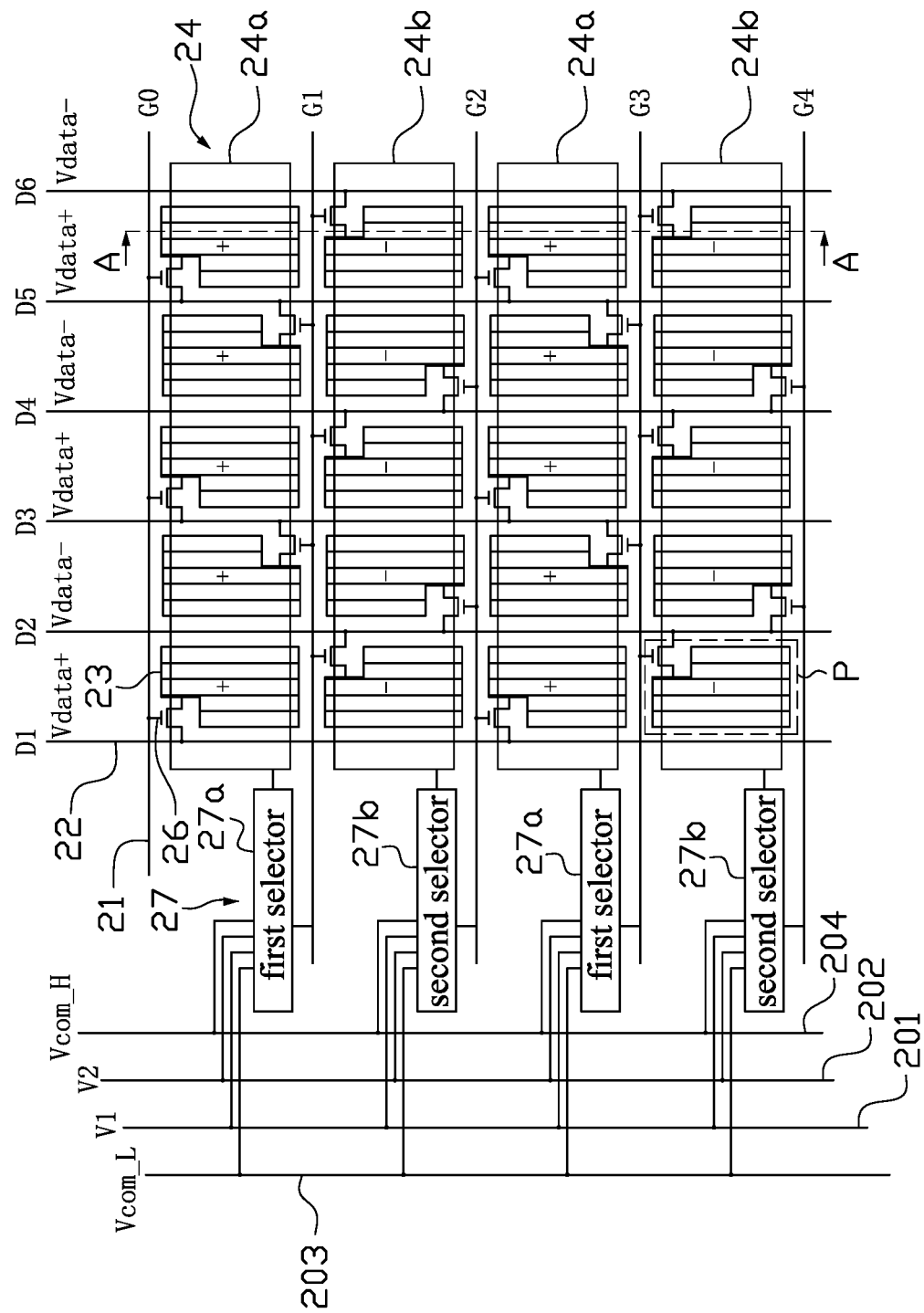
FIG. 4 is a schematic circuit diagram of a display panel of the liquid crystal display device of FIG. 3.
Figure 5:
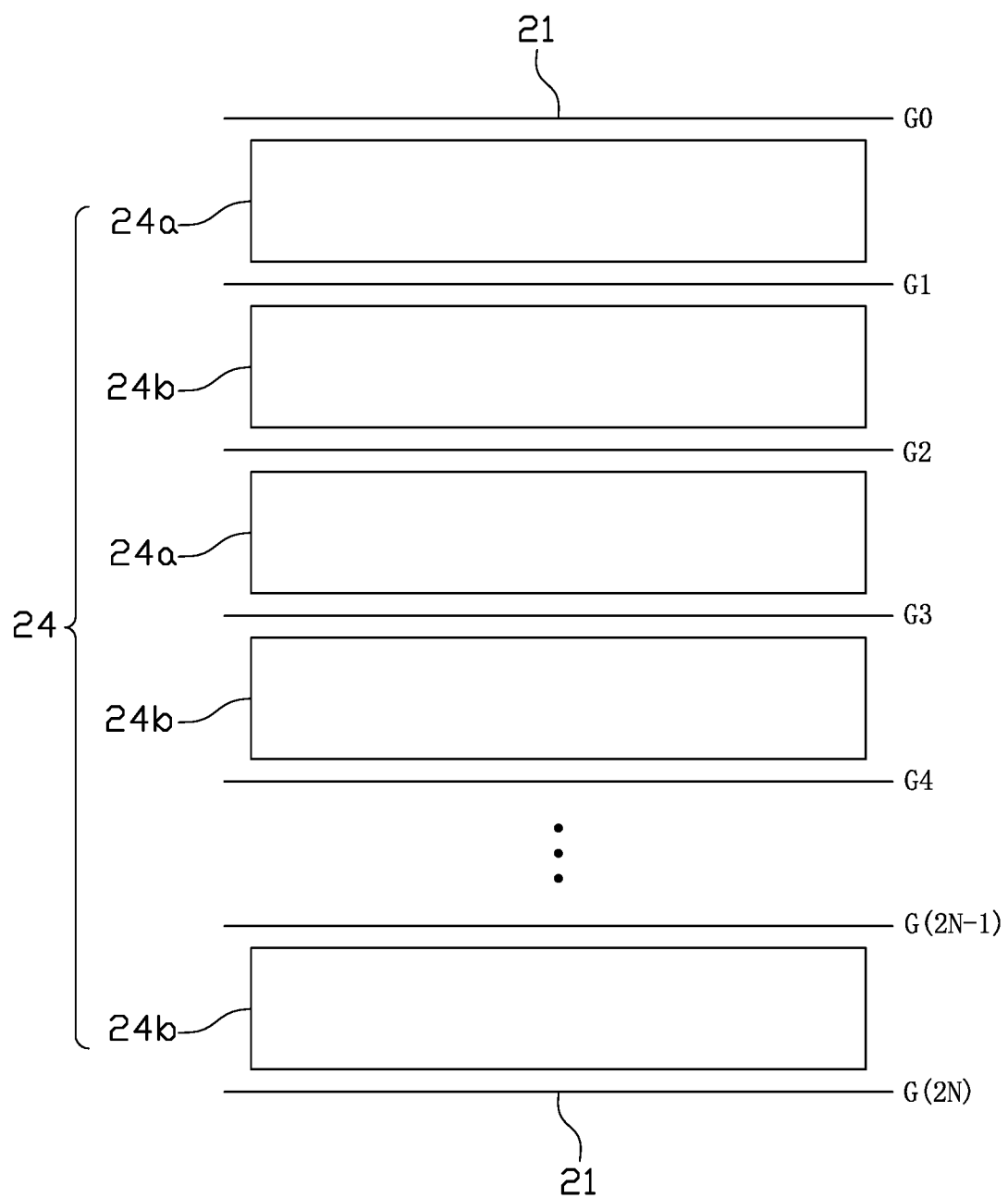
FIG. 5 is a schematic plan view of the common electrode strips on the display panel of FIG. 4.
Figure 7:
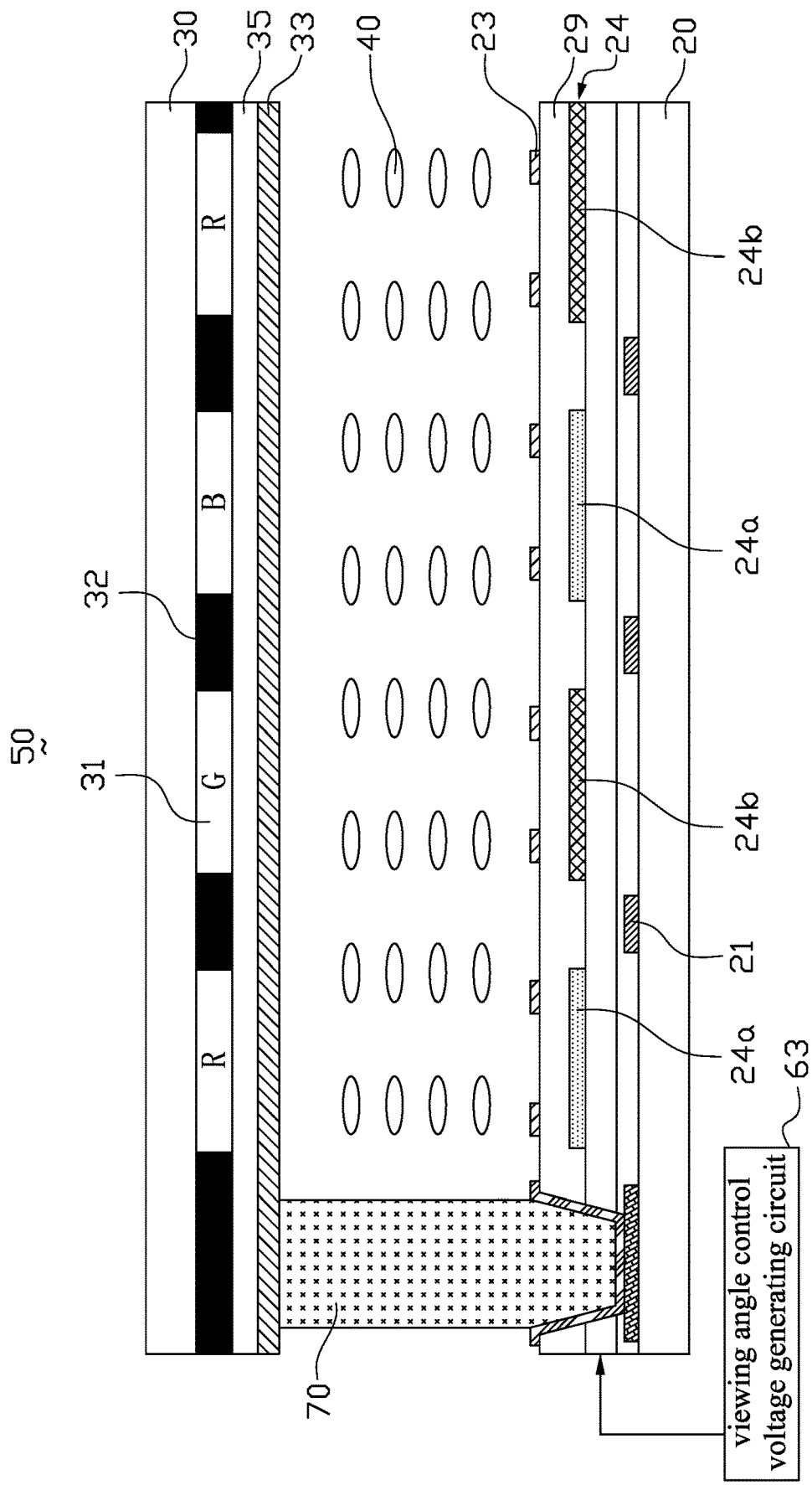
FIG. 7 is a schematic cross-sectional view of the display panel along line A-A of FIG. 4.

Referring to FIGS. 4, 5 and 7, the display panel 50 includes an array substrate 20, a color filter substrate 30 disposed opposite to the array substrate 20, and a liquid crystal layer 40 disposed between the array substrate 20 and the color filter substrate 30.

A plurality of scanning lines 21 and a plurality of data lines 22 are provided on the array substrate 20. The plurality of scanning lines 21 and the plurality of data lines 22 are insulated and intersected to define a plurality of pixel units P arranged in an array. In each pixel unit P, there is provided with a pixel electrode 23 and a thin film transistor 26, wherein the gate of the thin film transistor 26 is connected to the scanning line 21, the source of the thin film transistor 26 is connected to the data line 22, and the drain of the thin film transistor 26 is connected to the pixel electrode 23.

The gate driver 66 is connected to each scanning line 21, and the gate driver 66 is used to provide a scanning driving signal to each scanning line 21. The source driver 65 is connected to each data line 22, and the source driver 65 is used to provide a data driving voltage to each data line 22.

The array substrate 20 is also provided with a plurality of common electrode strips 24 arranged in parallel and spaced apart, and each common electrode strip 24 extends in the direction of the scanning line 21, wherein the plurality of common electrode strips 24 includes a plurality of first common electrode strips 24a and a plurality of second common electrode strips 24b. The plurality of first common electrode strips 24a and the plurality of second common electrode strips 24b are alternately arranged in the direction of the data line 22. In this embodiment, each common electrode strip 24 covers a corresponding row of pixel units P, where the plurality of first common electrode strips 24a respectively cover the pixel units P in odd rows, and the plurality of second common electrode strips 24b respectively cover the pixel units P in even rows.

In this embodiment, the pixel electrodes 23 and the common electrode strips 24 are located in different layers on the array substrate 20 with an insulating layer 29 being sandwiched between them, and the pixel electrodes 23 may be located above the common electrode strips 24 to form a liquid crystal display device of the fringe field switching (FFS) type. During normal display of the liquid crystal display device, a fringe electric field is generated between the common electrode strips 24 and the pixel electrodes 23, so that the liquid crystal molecules rotate in a plane substantially parallel to the substrates to obtain a wider viewing angle.

The color filter substrate 30 is provided with a color resist layer 31, a black matrix (BM) 32, and an upper electrode 33. The color resist layer 31 is, for example, R, and B color resists. The upper electrode 33 may be a planar electrode on the entire surface, that is, the upper electrode 33 covers the whole display area. An overcoat layer 35 may also be provided on the color filter substrate 30. The color resist layer 31 and the black matrix 32 are provided on the surface of the color filter substrate 30 facing the liquid crystal layer 40, the overcoat layer 35 covers the color resist layer 32 and the black matrix 31, and the upper electrode 33 is provided on the overcoat layer 35.

Figure 6:
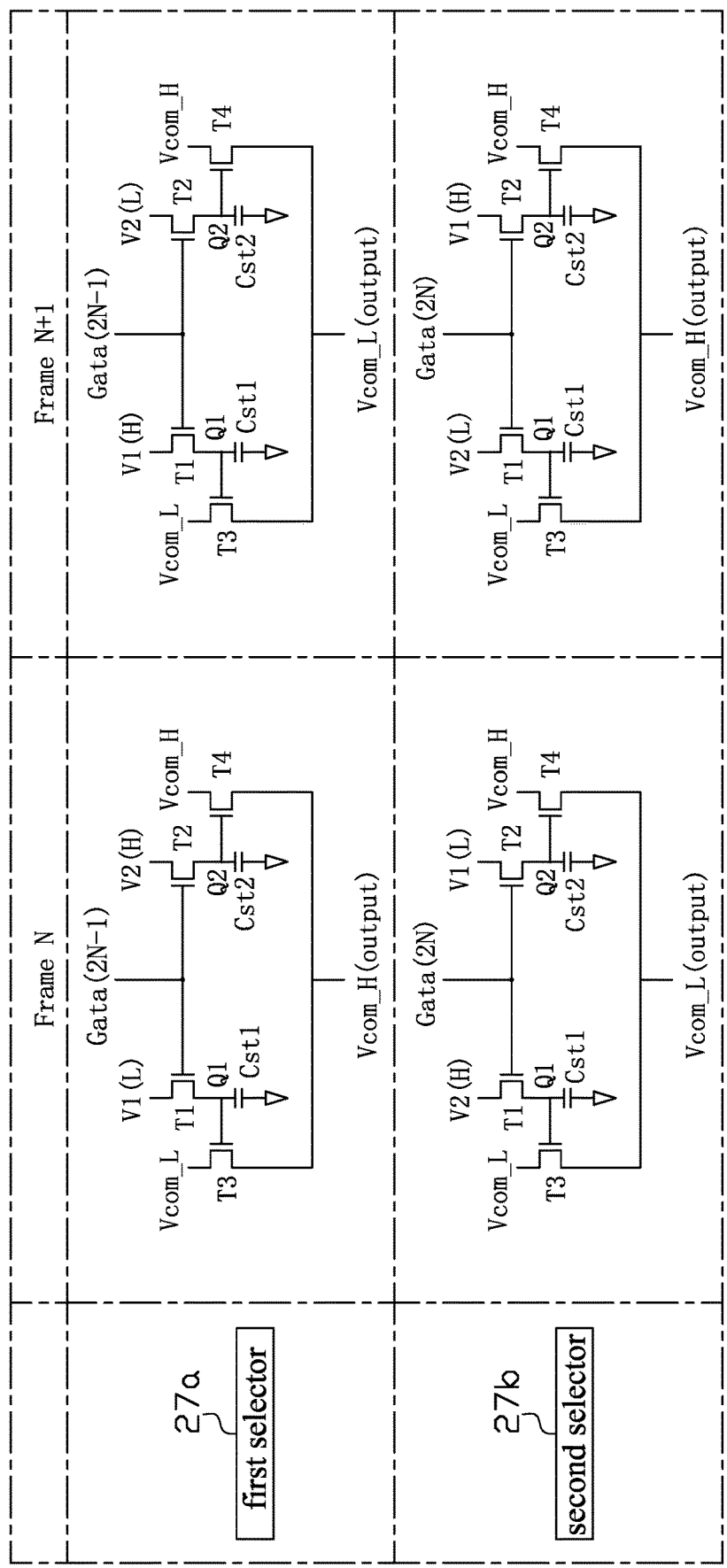
FIG. 6 is a schematic circuit diagram of the first selector and the second selector on the display panel of FIG. 4.

Referring to FIGS. 4 and 6, the array substrate 20 is further provided with a first signal line 201, a second signal line 202, a third signal line 203, a fourth signal line 204, and a plurality of selectors 27, wherein the plurality of selectors 27 includes a plurality of first selectors 27a and a plurality of second selectors 27b. Each first common electrode strip 24a is connected to the first signal line 201, the second signal line 202, the third signal line 203, the fourth signal line 204 and a corresponding scanning line 21 through a first selector 27a. Each second common electrode strip 24b is connected to the first signal line 201, the second signal line 202, the third signal line 203, the fourth signal line 204 and a corresponding scanning line 21 through a second selector 27b. The first signal line 201, the second signal line 202, the third signal line 203, the fourth signal line 204, and the plurality of selectors 27a, 27b may be disposed in the non-display area of the display panel 50.

Each first selector 27a and each second selector 27b have the same structure. Each first selector 27a or each second selector 27b includes a first switching element T1, a second switching element T2, a third switching element T3, a fourth switching element T4, a first storage capacitor Cst1 and a second storage capacitor Cst2. The control terminal of the first switching element T1 is connected to the control terminal of the second switching element T2 and connected to a corresponding scanning line 21. The first conductive end of the first switching element T1 is connected to one of the first signal line 201 and the second signal line 202. The first conductive end of the second switching element T2 is connected to the other one of the first signal line 201 and the second signal line 202. The second conductive end of the first switching element T1 is connected to the control terminal of the third switching element T3 and connected to the first node Q1. The second conductive end of the second switching element T2 is connected to the control terminal of the fourth switching element T4 and connected to the second node Q2. The first conductive end of the third switching element T3 is connected to the third signal line 203. The first conductive end of the fourth switching element T4 is connected to the fourth signal line 204. The second conductive end of the third switching element T3 is connected to the second conductive end of the fourth switching element T4 and connected to a corresponding common electrode strip 24. The first storage capacitor Cst1 is connected to the first node Q1, and the second storage capacitor Cst2 is connected to the second node Q2.

In this embodiment, for each first selector 27a, the first conductive end of the first switching element T1 is connected to the first signal line 201, and the first conductive end of the second switching element T2 is connected to the second signal line 202. For each second selector 27b, the first conductive end of the first switching element T1 is connected to the second signal line 202, and the first conductive end of the second switching element T2 is connected to the first signal line 201.

Specifically, the first switching element T1, the second switching element T2, the third switching element T3, and the fourth switching element T4 may be transistors, wherein the control terminal is the gate, one of the first conductive end and the second conductive end is the source, and the other one of the first conductive end and the second conductive end is the drain.

In this embodiment, the liquid crystal molecules in the liquid crystal layer 40 are positive liquid crystal molecules, i.e., with positive dielectric anisotropy. The positive liquid crystal molecules have the advantage of fast response. As shown in FIG. 7, in the initial state (that is, when no voltage is applied to the display panel 50), the positive liquid crystal molecules in the liquid crystal layer 40 assume a lying posture substantially parallel to the substrates 20, 30, that is, the long axis direction of the positive liquid crystal molecules is substantially parallel to the surfaces of the substrates 20, 30. However, in practical applications, the positive liquid crystal molecules in the liquid crystal layer 40 may have a small initial pretilt angle relative to the substrates 20, 30, and the initial pretilt angle may be in the range of less than or equal to 10 degrees, i.e., $0° \leq \theta \leq 10°$.

Referring to FIGS. 3 and 4, the display control unit 61 may be a timing controller (T-CON). The display control unit 61 is used to control the display panel 50 to realize picture display. Specifically, after the display control unit 61 processes the data to be displayed (display data), the display control unit 61 controls the gate driver 66 to sequentially send a scanning signal to each scanning line 21 to turn on the thin film transistors 26 of each row. When the thin film transistors 26 of each row are turned on, the display control unit 61 controls the source driver 65 to send data signals through the data lines 22 to charge the respective pixel units P of the row with the required voltages. When scanning of all the scanning lines 21 and charging of all the pixel units P are completed, the display of one frame is realized. Then, the above-mentioned display process is repeated to continuously refresh the picture. The refresh frequency of the picture is, for example, 60 Hz (that is, the picture is refreshed 60 times per second), to realize the continuous display of the picture.

The viewing angle control unit 62 may be an MCU (i.e., micro controller unit). The viewing angle control unit 62 is used to control the display panel 50 to switch between wide viewing angle display and narrow viewing angle display. Specifically, the viewing angle control unit 62 is used to receive a viewing angle switching signal and determine the display mode (wide viewing angle mode or narrow viewing angle mode) of the display panel 50 according to the viewing angle switching signal. The viewing angle switching signal may specifically be a high or low level signal, for example, a low level of the viewing angle switching signal corresponds to the wide viewing angle mode of the display panel 50, and a high level of the viewing angle switching signal corresponds to the narrow viewing angle mode of the display panel 50. Therefore, when the viewing angle control unit 62 receives a low level viewing angle switching signal, it is determined that the display panel 50 needs to be switched to a wide viewing angle mode; when the viewing angle control unit 62 receives a high level viewing angle switching signal, it is determined that the display panel 50 needs to be switched to a narrow viewing angle mode.

The gamma voltage generating circuit 64 is used to output gamma voltages to the source driver 65. When the display panel 50 is in the wide viewing angle display mode, the gamma voltage generating circuit 64 outputs a first group of gamma voltages Gamma1 to the source driver 65. When the display panel 50 is in the narrow viewing angle display, the gamma voltage generating circuit 64 outputs a second group of gamma voltages Gamma2 to the source driver 65. The first group of gamma voltages Gamma1 and the second group of gamma voltages Gamma2 are two groups of different gamma voltages.

The gamma voltage generating circuit 64 can provide two groups of independent gamma voltages, and output different groups of gamma voltages to the display panel 50 according to different display modes (i.e., the wide viewing angle mode and the narrow viewing angle mode) of the display panel 50, so that the liquid crystal display device can achieve better display effects in different display modes, and solve the problem of display deviations caused by existing display devices with switchable viewing angles when using the same set of gamma voltages in different display modes.

Specifically, the gamma voltage generating circuit 64 may use a resistor string or a gamma chip to generate the different groups of required gamma voltages.

In one embodiment, the gamma voltage generating circuit 64 includes a first resistor string and a second resistor string, wherein the first resistor string is used to generate the first group of gamma voltages Gamma1, and the second resistor string is used to generate the second group of gamma voltages Gamma2. Each resistor string includes multiple resistors, the first end of the resistor string receives a reference voltage, and the second end of the resistor string is grounded, so that each resistor string is divided by the multiple resistors to obtain a group of gamma voltages. When the display panel 50 is in the wide viewing angle display mode, the gamma voltage generating circuit 64 uses the first resistor string to generate and output the first group of gamma voltages Gamma1; and when the display panel 50 is in the narrow viewing angle display mode, the gamma voltage generating circuit 64 uses the second resistor string to generate and output the second group of gamma voltages Gamma2.

In another embodiment, the gamma voltage generating circuit 64 includes a gamma chip, and uses the gamma chip to generate the first group of gamma voltages Gamma1 or the second group of gamma voltages Gamma2. When the display panel 50 is in the wide viewing angle display mode, the gamma chip generates and outputs the first group of gamma voltages Gamma1; and when the display panel 50 is in the narrow viewing angle display mode, the gamma chip generates and outputs the second group of gamma voltages Gamma2.

In another embodiment, the gamma voltage generating circuit 64 includes a resistor string and a gamma chip, wherein the resistor string is used to generate the first group of gamma voltages Gamma1, and the gamma chip is used to generate the second group of gamma Voltages Gamma2. When the display panel 50 is in the wide viewing angle display mode, the first group of gamma voltages Gamma1 is output using the resistor string; and when the display panel 50 is in the narrow viewing angle display mode, the second group of gamma voltages Gamma2 is output using the gamma chip.

Referring to FIG. 3, the viewing angle control voltage generating circuit 63 is used to output a DC (direct current) reference voltage Vref, a first AC (alternating current) control voltage V1, a second AC control voltage V2, a first DC voltage Vcom_L and a second DC voltage Vcom_H to the display panel 50.

More specifically, the viewing angle control voltage generating circuit 63 includes a power chip 631, a reference voltage generating unit 632, and a control voltage generating unit 633. The reference voltage generating unit 632 is connected to the power chip 631, and the control voltage generating unit 633 is connected to the viewing angle control unit 62 and the reference voltage generating unit 632. The power chip 631 is connected to a 3.3V power supply, the reference voltage generating unit 632 is used to output the DC reference voltage Vref to the display panel 50, and the control voltage generating unit 633 is used to output the first AC control voltage V1, the second AC control voltage V2, the first DC voltage Vcom_L and the second DC voltage Vcom_H to the display panel 50.

The first AC control voltage V1 is applied to the first signal line 201, and the second AC control voltage V2 is applied to the second signal line 202. The first DC voltage Vcom_L is applied to the third signal line 203, the second DC voltage Vcom_H is applied to the fourth signal line 204, and the DC reference voltage Vref is applied to the upper electrode 33.

Specifically, as shown in FIG. 7, in order to apply a voltage signal to the upper electrode 33 of the color filter substrate 30, the upper electrode 33 can be conducted from the color filter substrate 30 to the array substrate 20 through a conductive adhesive 70 in the peripheral non-display area. The viewing angle control voltage generating circuit 63 firstly provides the DC reference voltage Vref to the array substrate 20, and then the array substrate 20 applies the DC reference voltage Vref to the upper electrode 33 of the color filter substrate 30 through the conductive adhesive 70.

Figure 8:
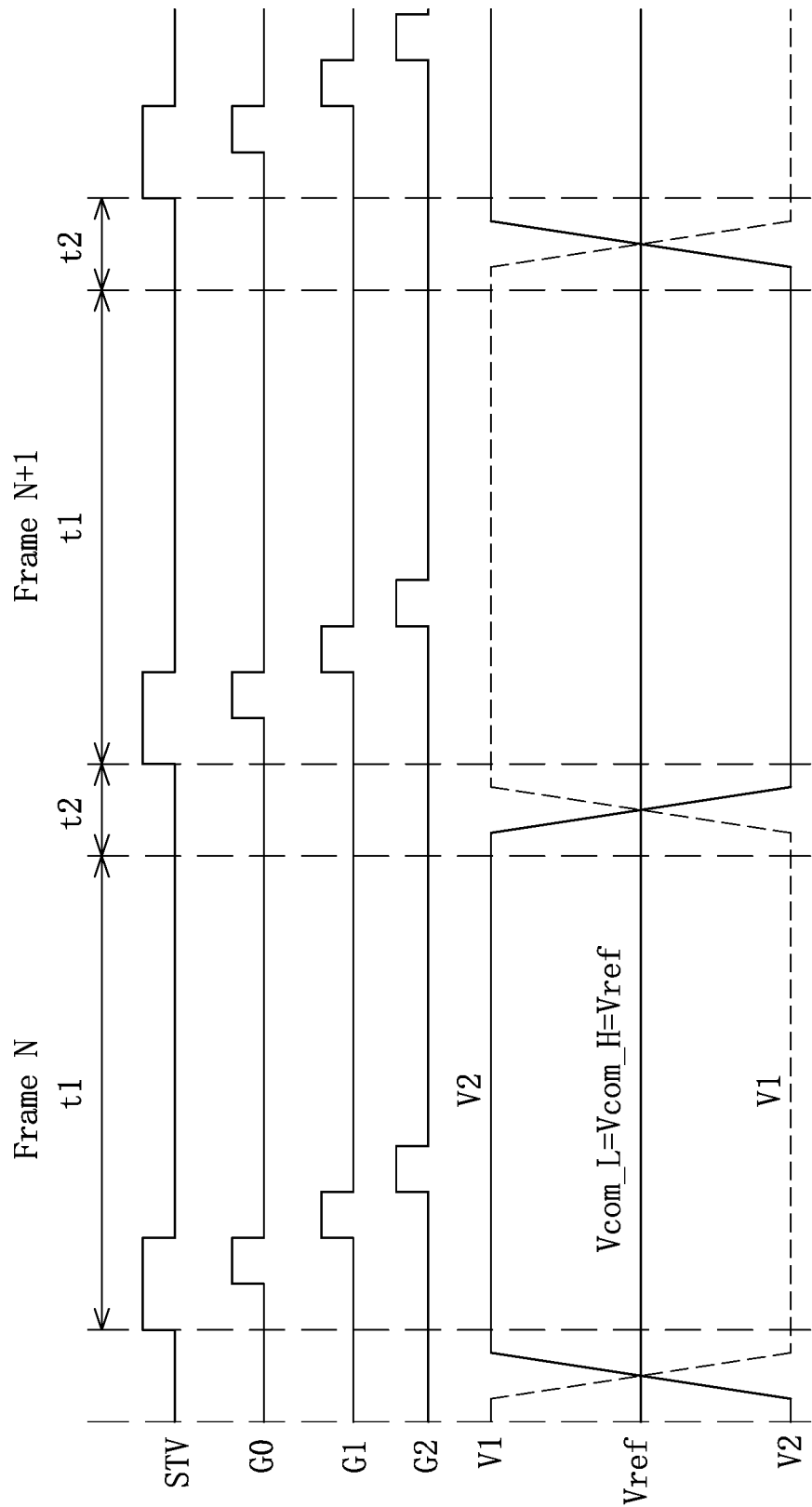
FIG. 8 is a schematic diagram showing the voltage waveforms when the display panel of FIG. 7 is displayed in a wide viewing angle mode.

Referring to FIGS. 7 and 8, when the display panel 50 is in the wide viewing angle display mode, the viewing angle control voltage generating circuit 63 outputs the DC reference voltage Vref, the first AC control voltage V1, the second AC control voltage V2, the first DC voltage Vcom_L and the second DC voltage Vcom_H to the display panel 50, wherein the first AC control voltage V1 and the second AC control voltage V2 are inversely symmetric with respect to the DC reference voltage Vref, and the first DC voltage Vcom_L and the second DC voltage Vcom_H are both equal to the DC reference voltage Vref.

Figure 9A:
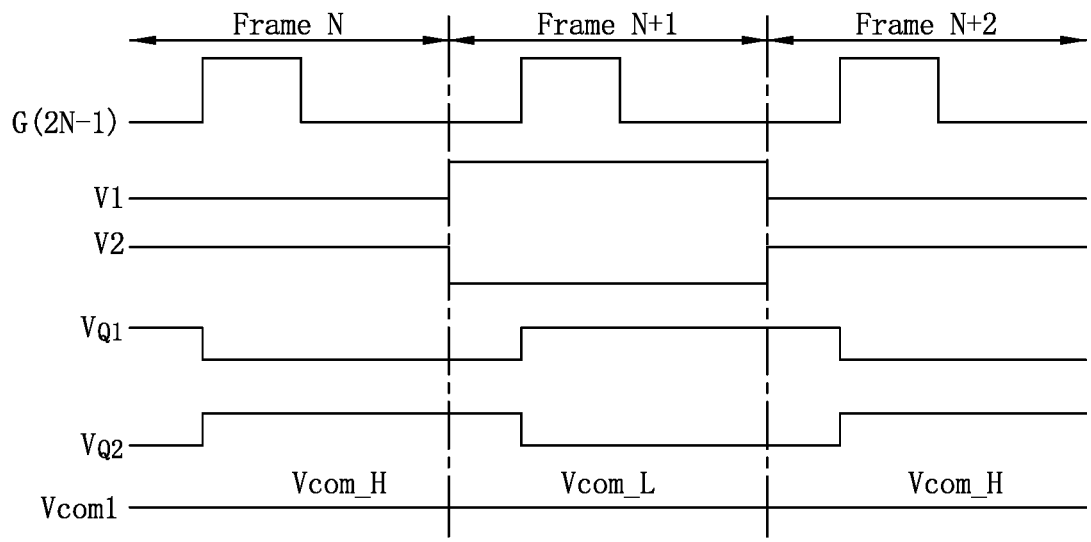
FIG. 9a is a schematic diagram showing the driving waveforms of the first selector when the display panel of FIG. 4 is displayed in a wide viewing angle mode.
Figure 9B:
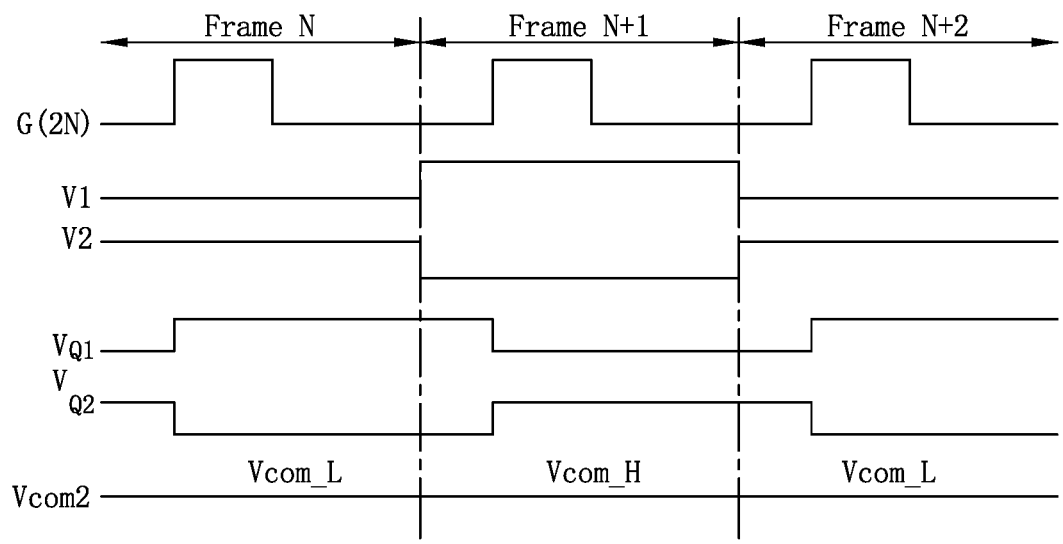
FIG. 9b is a schematic diagram showing the driving waveforms of the second selector when the display panel of FIG. 4 is displayed in a wide viewing angle mode.

Referring to FIGS. 6, 9a and 9b, when the display panel 50 is in the wide viewing angle display mode, the first signal line 201 is applied with the first AC control voltage V1, the second signal line 202 is applied with the second AC control voltage V2, the third signal line 203 is applied with the first DC voltage Vcom_L, and the fourth signal line 204 is applied with the second DC voltage Vcom_H. Through the selectors 27 described above, when the scanning signals are sequentially applied to the plurality of scanning lines 21, the viewing angle control voltage generating circuit 63 outputs a first common voltage Vcom1 to the plurality of first common electrode strips 24a through the plurality of first selectors 27a respectively, and outputs a second common voltage Vcom2 to the plurality of second common electrode strips 24b through the plurality of second selectors 27b respectively.

In FIGS. 9a and 9b, G(2N−1) represents the scanning signal applied to the scanning lines 21 at the odd positions, G(2N) represents the scanning signal applied to the scanning lines 21 at the even positions, $V_{Q1}$ represents the voltage at the first node Q1, $V_{Q2}$ represents the voltage at the second node Q2, Vcom1 represents the first common voltage charged on each first common electrode strip 24a, and Vcom2 represents the second common voltage charged on each second common electrode strip 24b.

In the $N^{th}$ frame, for the first selector 27a, when the scanning line G(2N−1) outputs a high level voltage, T2 is turned on, because V2 is at a high level, Q2 is pulled high by V2, T4 is turned on, and Vcom_H is output to the first common electrode strip 24a through T4; when the scanning line G(2N−1) is closed, the high level voltage at Q2 is stored by Cst2, and T4 remains in the opened state to make the first common voltage charged on the first common electrode strip 24a more stable; during this period, V1 is at a low level, Q1 is pulled low by V1, and T3 is turned off.

In the $N^{th}$ frame, for the second selector 27b, when the scanning line G(2N) outputs a high level voltage, T1 is turned on, because V2 is at a high level, Q1 is pulled high by V2, T3 is turned on, and Vcom_L is output to the second common electrode strips 24b through T3; when the scanning line G(2N) is closed, the high level voltage at Q1 is stored by Cst1, and T3 remains in the opened state to make the second common voltage charged on the second common electrode strip 24b stable; during this period, V1 is at a low voltage, Q2 is pulled low by V1, and T4 is turned off.

In the $(N+1)^{th}$ frame, for the first selector 27a, when the scanning line G(2N−1) outputs a high level voltage, T1 is turned on, because V1 is at a high level, Q1 is pulled high by V1, T3 is turned on, and Vcom_L is output to the first common electrode strip 24a through T3; when the scanning line G(2N−1) is closed, the high level voltage at Q1 is stored by Cst1, and T3 remains in the opened state to make the first common voltage charged on the first common electrode strip 24a more stable; during this period, V2 is at a low level, Q2 is pulled low by V2, and T4 is turned off.

In the $(N+1)^{th}$ frame, for the second selector 27b, when the scanning line G(2N) outputs a high level voltage, T2 is turned on, because V1 is at a high level, Q2 is pulled high by V1, T4 is turned on, and Vcom_H is output to the second common electrode strip 24b through T4; when the scanning line G(2N) is closed, the high level voltage at Q2 is stored by Cst2, and T4 remains in the opened state to make the second common voltage charged on the second common electrode strip 24b more stable; during this period, V2 is at a low level, Q1 is pulled low by V2, and T3 is turned off.

The driving of the $(N+2)^{th}$ frame is the same as that in the $N^{th}$ frame, and then it is repeated as such.

Cst1 and Cst2 are used as storage capacitors, to maintain the voltages at the nodes Q1 and Q2 when the scanning line 21 is closed and T1 and T2 are turned off, and maintain the opened or closed states of T3 and T4, respectively.

When the display panel 50 is in the wide viewing angle mode, since the first DC voltage Vcom_L and the second DC voltage Vcom_H are both equal to the DC reference voltage Vref, the first common voltage Vcom1 output to the plurality of first common electrode strips 24a and the second common voltage Vcom2 output to the second common electrode strips 24b are equal to the DC reference voltage Vref, so that the voltage difference between all the common electrode strips 24 of the array substrate 20 and the upper electrode 33 of the color filter substrate 30 is zero, the tilt angle of the liquid crystal molecules in the liquid crystal layer 40 does not change and remains in the lying posture. As a result, the display panel 50 realizes wide viewing angle display.

Figure 10:
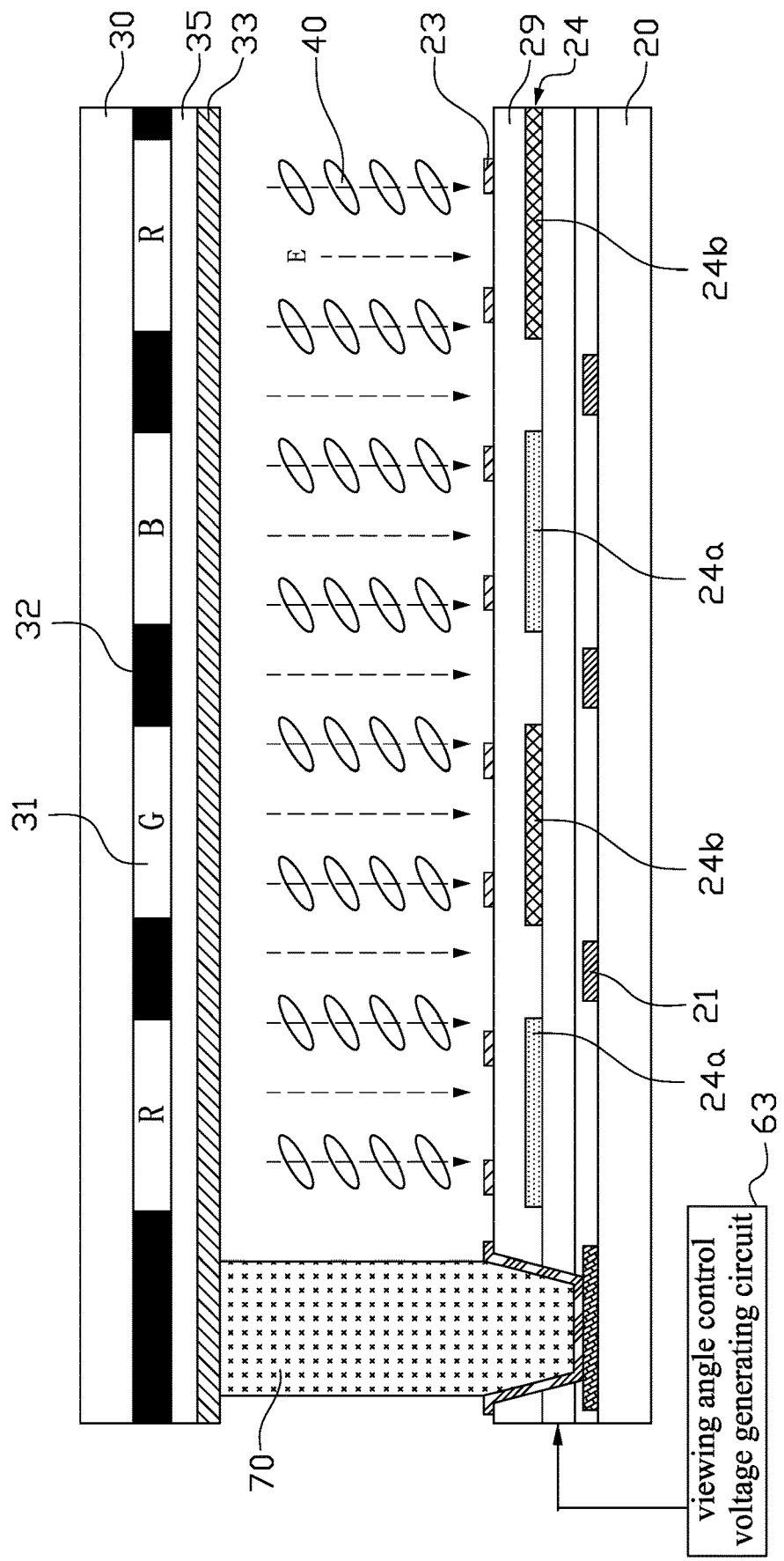
FIG. 10 is a schematic view when the display panel of FIG. 7 is displayed in a narrow viewing angle mode.
Figure 11:
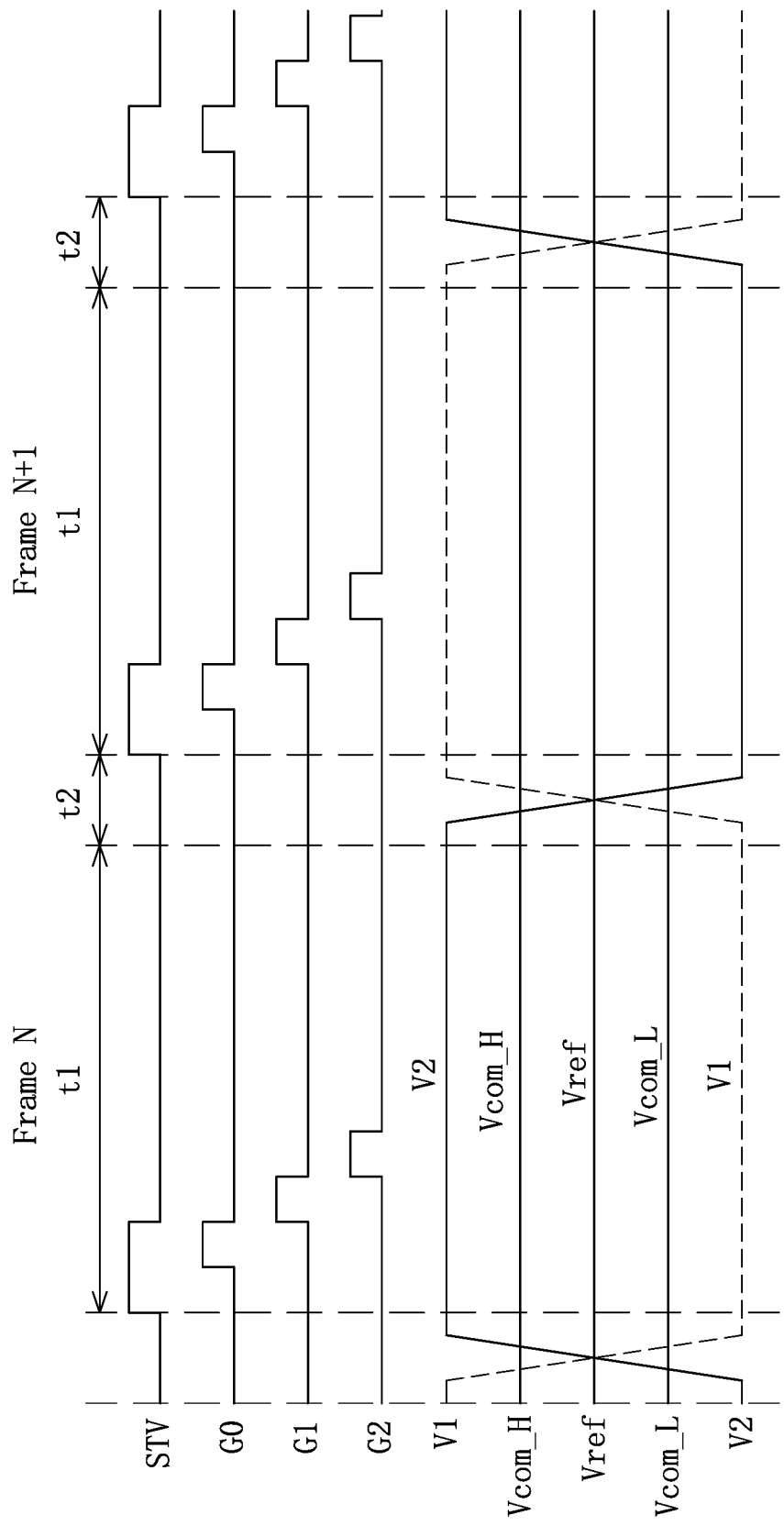
FIG. 11 is a schematic diagram showing the voltage waveforms when the display panel of FIG. 10 is displayed in a narrow viewing angle mode.

Referring to FIGS. 10 and 11, when the display panel 50 is in the narrow viewing angle display mode, the viewing angle control voltage generating circuit 63 outputs the DC reference voltage Vref, the first AC control voltage V1, the second AC control voltage V2, the first DC voltage Vcom_L and second DC voltage Vcom_H to the display panel 50, wherein the first AC control voltage V1 and the second AC control voltage V2 are inversely symmetric with respect to the DC reference voltage Vref, the first DC voltage Vcom_L is lower than the DC reference voltage Vref, and the second DC voltage Vcom_H is higher than the DC reference voltage Vref.

Figure 12A:
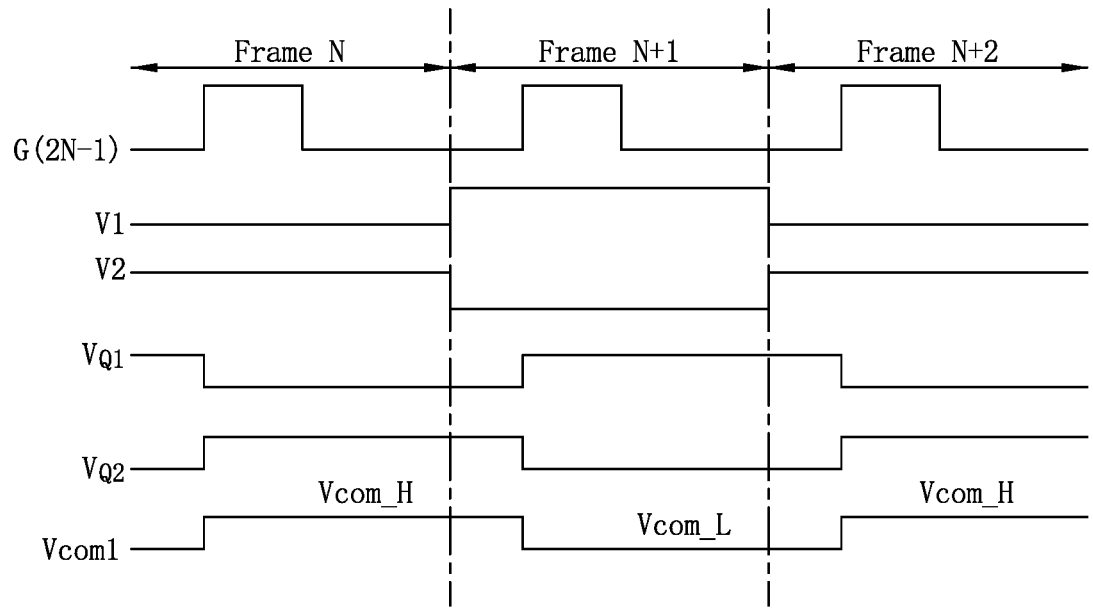
FIG. 12a is a schematic diagram showing the driving waveforms of the first selector when the display panel of FIG. 4 is displayed in a narrow viewing angle mode.
Figure 12B:
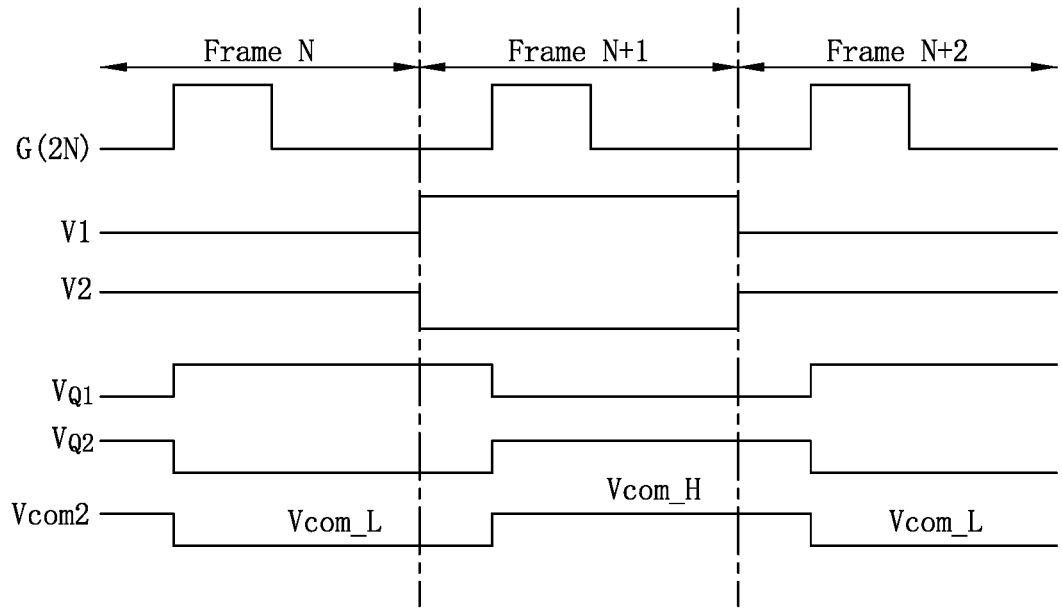
FIG. 12b is a schematic diagram showing the driving waveforms of the second selector when the display panel of FIG. 4 is displayed in a narrow viewing angle mode.

Referring to FIGS. 6, 12a and 12b, when the display panel 50 is in the narrow viewing angle display mode, the first signal line 201 is applied with the first AC control voltage V1, the second signal line 202 is applied with the second AC control voltage V2, the third signal line 203 is applied with the first DC voltage Vcom_L, and the fourth signal line 204 is applied with the second DC voltage Vcom_H. Through the selectors 27 described above, when the scanning signals are sequentially applied to the plurality of scanning lines 21, the viewing angle control voltage generating circuit 63 outputs a first common voltage Vcom1 respectively to the plurality of first common electrode strips 24a through the plurality of first selectors 27a, and outputs a second common voltage Vcom2 respectively to the plurality of second common electrode strips 24b through the plurality of second selectors 27b.

In FIGS. 12a and 12b, G(2N−1) represents the scanning signal applied to the scanning lines 21 at the odd positions, G(2N) represents the scanning signal applied to the scanning lines 21 at the even positions, $V_{Q1}$ represents the voltage at the first node Q1, $V_{Q2}$ represents the voltage at the second node Q2, Vcom1 represents the first common voltage charged on each first common electrode strip 24a, and Vcom2 represents the second common voltage charged on each second common electrode strip 24b.

When the display panel 50 is in the narrow viewing angle display mode, since the first DC voltage Vcom_L is lower than the DC reference voltage Vref, and the second DC voltage Vcom_H is higher than the DC reference voltage Vref, the first common voltage Vcom1 output to the plurality of first common electrode strips 24a and the second common voltage Vcom2 output to the plurality of second common electrode strips 24b are opposite in polarity and have a large voltage difference with respect to the DC reference voltage Vref, so that there is a certain voltage difference between all the common electrode strips 24 of the array substrate 20 and the upper electrode 33 of the color filter substrate 30, and a strong vertical electric field E (as shown by the arrows in FIG. 10) is generated between the array substrate 20 and the color filter substrate 30 in the liquid crystal layer. The positive liquid crystal molecules will deflect under the action of the vertical electric field E, which increases the tilt angle between the liquid crystal molecules and the substrates 20, 30, and the liquid crystal molecules change from a lying posture to a tilted posture, causing the display panel 50 to appear light leakage at large observing angles, so that the contrast viewed from oblique viewing direction is reduced and the viewing angle is narrowed. As a result, the display panel 50 finally achieves a narrow viewing angle display.

Specifically, when the display panel 50 is in the narrow viewing angle display mode, the voltage difference between the first DC voltage Vcom_L and the DC reference voltage Vref and the voltage difference between the second DC voltage Vcom_H and the DC reference voltage Vref may be selected to be greater than 3V (i.e., |Vcom_L−Vref|≥3V, |Vcom_H−Vref|≥3V), so that the voltage difference between each common electrode strip 24 and the upper electrode 33 is greater than 3V, and a better narrow viewing angle display effect can be achieved.

As shown in FIGS. 8 and 11, the polarities of the first AC control voltage V1 and the second AC control voltage V2 can be reversed once per frame, and the two control voltages have an inverse symmetric relationship with respect to the DC reference voltage Vref. The waveforms of the first AC control voltage V1 and the second AC control voltage V2 may be square waves, sine waves, triangle waves, sawtooth waves, etc., which are shown as square waves in the figures. In addition, each frame has a display time period t1, and a blanking time period t2 may be provided between two adjacent frames. The blanking time period is a transition time period between two adjacent frames. The AC control voltage V1 and the second AC control voltage V2 can switch the polarity during the blanking time period.

It should be noted that, regardless of whether the display panel 50 is in the wide viewing angle display mode or in the narrow viewing angle display mode, the DC reference voltage Vref applied to the upper electrode 33 is constant. Therefore, by controlling the magnitudes of the first DC voltage Vcom_L and the second DC voltage Vcom_H, the display panel 50 can be controlled to switch between the wide viewing angle mode and the narrow viewing angle mode. When both the first DC voltage Vcom_L and the second DC voltage Vcom_H are equal to the DC reference voltage Vref, the display panel 50 is in the wide viewing angle display mode; when the first DC voltage Vcom_L is lower than the DC reference voltage Vref, and the second DC voltage Vcom_H is higher than the DC reference voltage Vref such that there is a certain voltage difference between the first DC voltage Vcom_L and the DC reference voltage Vref and between the second DC voltage Vcom_H and the DC reference voltage Vref, the display panel 50 is in the narrow viewing angle display mode.

During the display process, the display control unit 61 is further used to output a synchronization control signal (STV) to the viewing angle control unit 62. According to the synchronization control signal, the viewing angle control unit 62 controls the outputs of the viewing angle control voltage generating circuit 63 and the gamma voltages to synchronize with the synchronization control signal.

As shown in FIG. 4, in this embodiment, the pixel units P in each row are separately connected to the two scanning lines 21 on the upper and lower sides of this row of pixel units P, and the common electrode strip 24 in each row is connected, through a corresponding selector 27, to the scanning line 21 on the lower side of this row of pixel units P, but it is not limited. For example, in other embodiments, the common electrode strip 24 in each row may also be connected, through a corresponding selector 27, to the scanning line 21 on the upper side of this row of pixel units P (not shown).

In this embodiment, the pixel units P in each row are alternately connected to the two scanning lines 21 on the upper and lower sides of this row of pixel units P. For example, for the first row of pixel units P, the various pixel units P at the odd positions are connected to the upper scanning line G0, and the various pixel units P at the even positions are connected to the lower scanning line G1; for the second row of pixel units P, the various pixel units P at the odd positions are connected to the upper scanning line G1, and the various pixel units P at the even positions are connected to the lower scanning line G2; the above arrangements are repeated every two rows thereafter.

In this embodiment, the pixel units P in each column are alternately connected to the two data lines 22 on the left and right sides of this column of pixel units P. For example, for the first column of pixel units P, the various pixel units P at the odd positions are connected to the data line D1 on the left side, and the various pixel units P at the even positions are connected to the data line D2 on the right side; for the second column of pixel units P, the various pixel units P at the odd positions are connected to the data line D3 on the right side, and the various pixel units P at the even positions are connected to the data line D2 on the left side; the above arrangements are repeated every two columns thereafter.

Therefore, the pixel units P in each odd row are only connected to the data lines 22 at the odd positions, and the pixel units P in each even row are only connected to the data lines 22 at the even positions, so that the pixel units P in the odd rows are charged only through the data lines 22 at the odd positions, and the pixel units P in the even rows are charged only through the data lines 22 at the even positions. For example, the pixel units P in the first row are only connected to the data lines 22 at the odd positions (i.e., D1, D3, D5, . . . ), so that the pixel units P in the first row are charged only through the data lines 22 at the odd positions. Similarly, the pixel units P in the remaining odd rows are also charged only through the data lines 22 at the odd positions. The pixel units P in the second row are only connected to the data lines 22 at the even positions (i.e., D2, D4, D6, . . . ), so that the pixel units P in the second row are charged only through the data lines 22 at the even positions. Similarly, the pixel units P in the remaining even rows are also charged only through the data lines 22 at the even positions. In this way, the polarity of the data voltage (Vdata) applied to each data line 22 can be maintained unchanged in the same frame, for example, data voltages with positive polarity (Vdata+) are applied through the data lines 22 at the odd positions (i.e., D1, D3, D5, . . . ), data voltages with negative polarity (Vdata−) are applied through the data lines 22 at the even positions (i.e., D2, D4, D6, . . . ), so that the display panel 50 can realize row inversion, which can reduce power consumption.

Figure 13A:
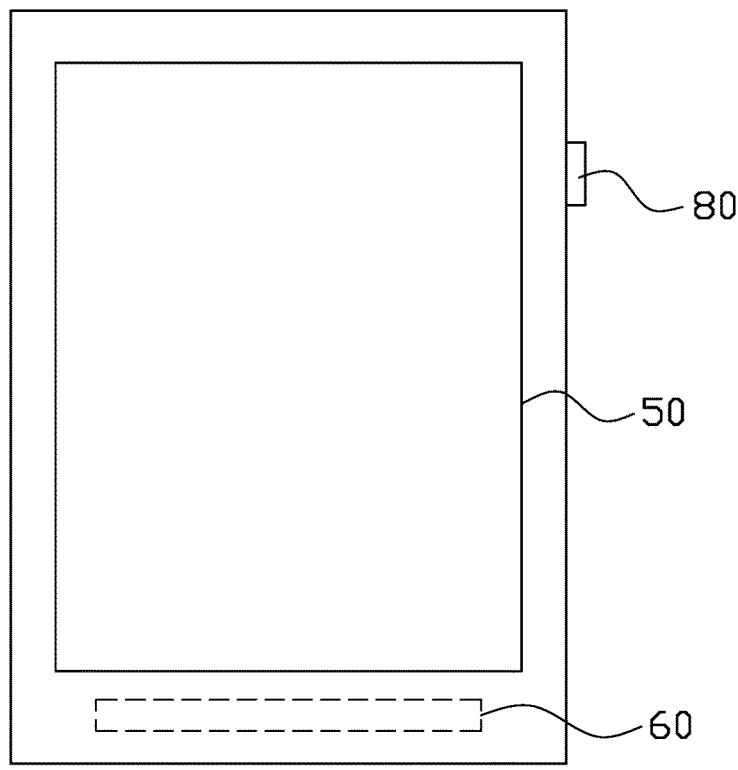
FIGS. 13a to 13b show the schematic diagrams of planar structure of the liquid crystal display device of FIG. 3.
Figure 13B:
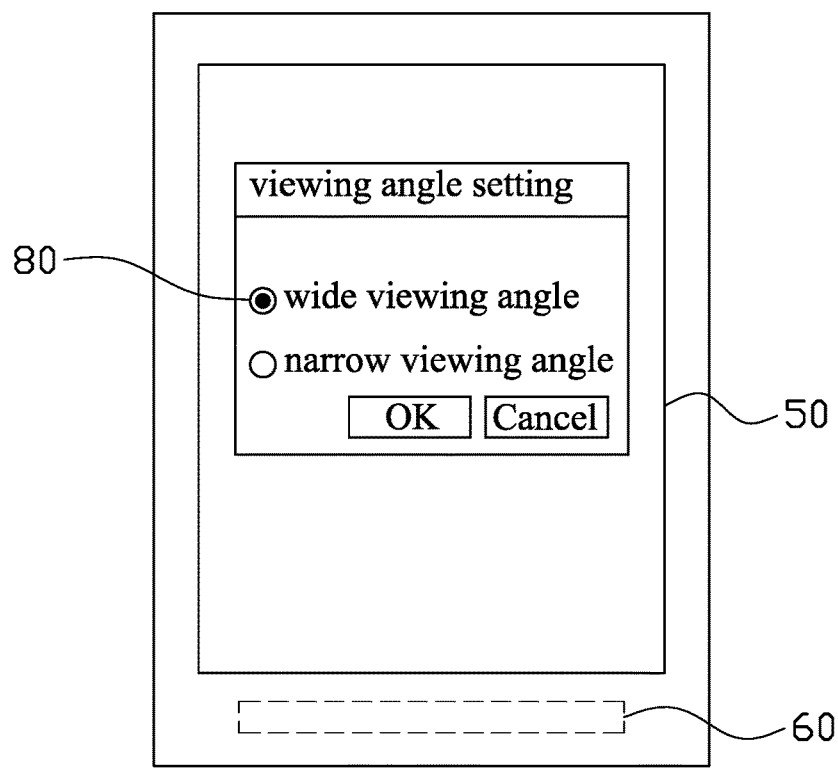

Referring to FIGS. 13a and 13b, the liquid crystal display device may be provided with a viewing angle switching button 80. The viewing angle switching button 80 may be a mechanical button (as shown in FIG. 13a) or a virtual button (as shown in FIG. 13b, to set the viewing angle through software). When it is needed to switch between wide and narrow viewing angle modes, users can send a viewing angle switching signal to the liquid crystal display device by operating the viewing angle switching button 80. The viewing angle control unit 62 receives the viewing angle switching signal and determines the display mode of the display panel 50 (wide viewing angle mode or narrow viewing angle mode) according to the viewing angle switching signal. Thus, by operating the viewing angle switching button 80, users can easily switch between wide viewing angle mode and narrow viewing angle mode, with good operational flexibility and convenience.

Figure 14:
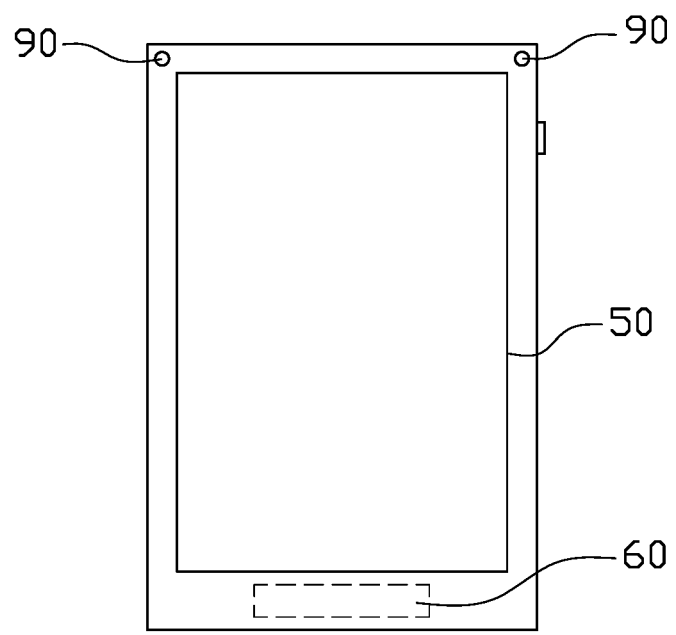
FIG. 14 shows another schematic diagram of planar structure of the liquid crystal display device of FIG. 3.

Referring to FIG. 14, in other embodiments, the liquid crystal display device may be provided with a detection sensor 90, and the detection sensor 90 is connected to the viewing angle control unit 62. The detection sensor 90 is used to detect whether there are persons near the display panel 50. The number of the detection sensor 90 may be multiple, distributed on the outer shell of the display panel 50. The detection sensor 90 may be an infrared sensor. The viewing angle control unit 62 can control the display panel 50 to automatically switch between wide and narrow viewing angle modes according to the detection result of the detection sensor 90. For example, when the detection sensor 90 detects that someone is near the display panel 50, it sends a high level viewing angle switching signal to the viewing angle control unit 62, and after receiving the high level viewing angle switching signal, the viewing angle control unit 62 controls the display panel 50 to switch to the narrow viewing angle mode; when the detection sensor 90 detects that nobody is near the display panel 50, it sends a low level viewing angle switching signal to the viewing angle control unit 62, and after receiving the low level viewing angle switching signal, the viewing angle control unit 62 controls the display panel 50 to switch to the wide viewing angle mode. Thus, by setting the detection sensor 90, the wide and narrow viewing angle modes can be automatically switched, without requiring the user to manually switch the wide and narrow viewing angle modes, thereby improving the user experience.

In this embodiment, the voltage for controlling the switching of the viewing angle is transferred from the viewing angle control electrode on the color filter substrate side to the common electrode on the array substrate side, and the common electrode on the array substrate 20 is cut into a plurality of independent common electrode strips 24, wherein each common electrode strip 24 is correspondingly connected to a scanning line 21 through a selector 27a, 27b. When the scanning line 21 in each row is opened, the common electrode strip 24 covering each row of pixel units P is charged with a common voltage through the selector 27a, 27b, so that each common electrode strip 24 is independently charged with voltage signal during scanning, thereby alleviating the problem of uneven display (i.e., mura) and flicker in the display panel 50 due to the capacitive coupling effect, and improving the display quality. The frame frequency of the display panel 50 can be maintained at 60 Hz, which make the drive simple and has low power consumption.

Second Embodiment

Figure 15:
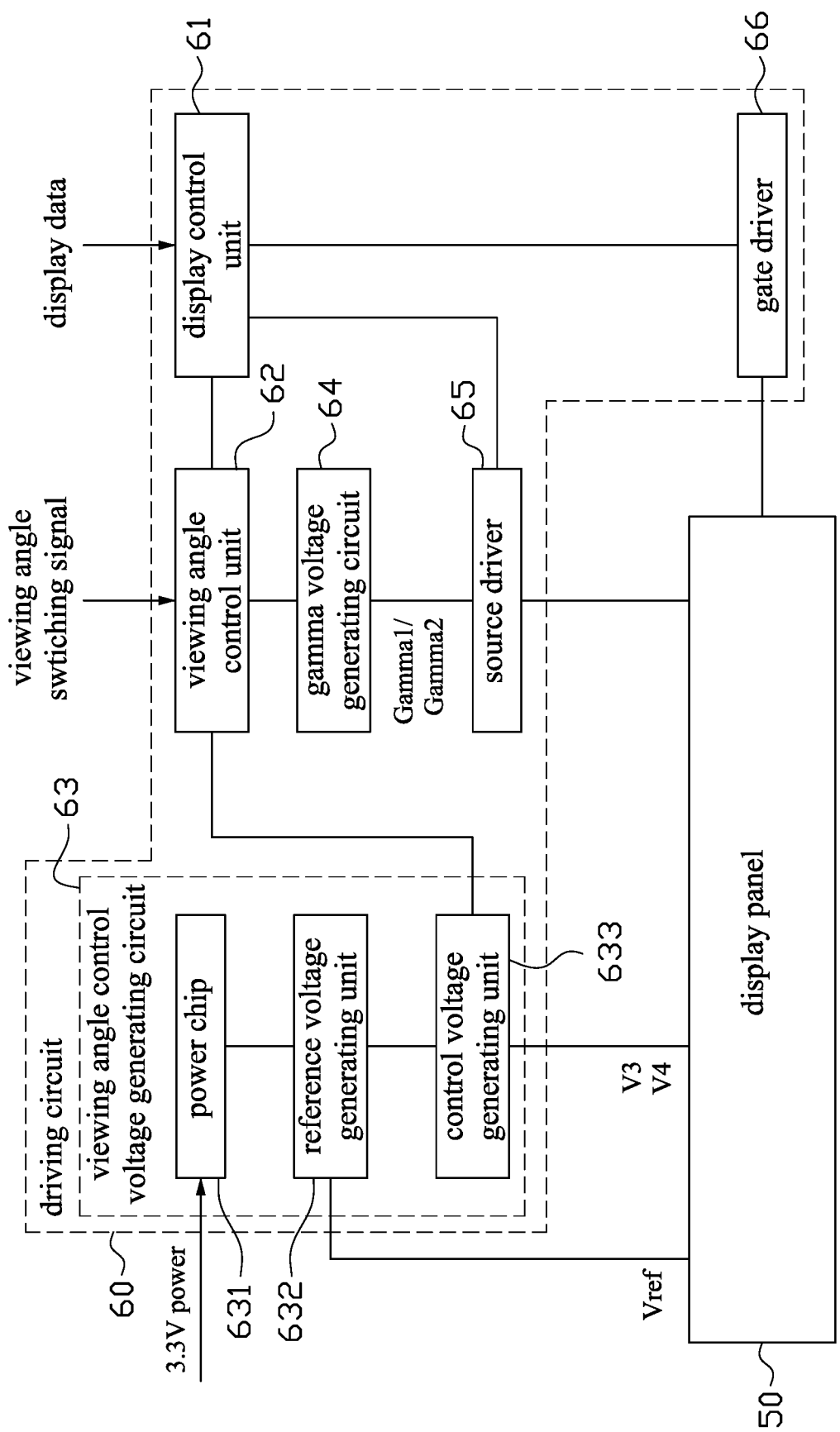
FIG. 15 is a block diagram of a liquid crystal display device according to the second embodiment of the present invention.

Referring to FIG. 15, the liquid crystal display device provided by the second embodiment of the present invention includes a display panel 50 with a switchable viewing angle, and a driving circuit 60 for driving the display panel 50. The display panel 50 can be switched between a wide viewing angle mode and a narrow viewing angle mode. The driving circuit 60 includes a display control unit 61, a viewing angle control unit 62, a viewing angle control voltage generating circuit 63, a gamma voltage generating circuit 64, a source driver 65, and a gate driver 66. The viewing angle control unit 62 is connected to the display control unit 61, the viewing angle control voltage generating circuit 63 and the gamma voltage generating circuit 64. The source driver 65 is connected to the display control unit 61 and the gamma voltage generating circuit 64. The gate driver 66 is connected to the display control unit 61.

The differences between this embodiment and the above-mentioned first embodiment are mainly described below, and the common structures will not be repeated.

Figure 16:
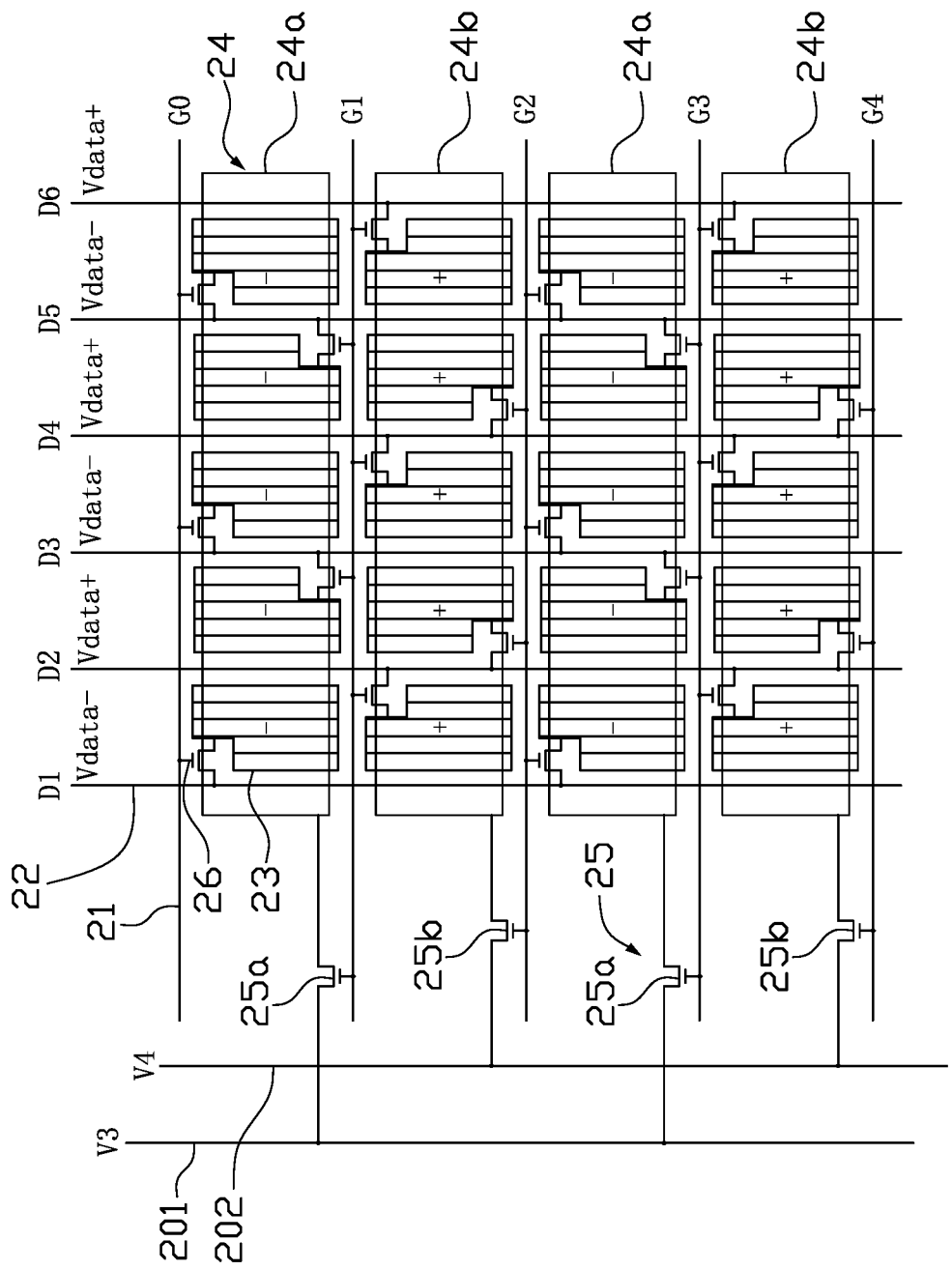
FIG. 16 is a schematic circuit diagram of a display panel of the liquid crystal display device of FIG. 15.

Referring to FIGS. 15 and 16, the array substrate 20 of the display panel 50 is further provided with a first signal line 201, a second signal line 202 and a plurality of switches 25. The plurality of switches 25 includes a plurality of first switches 25a and a plurality of second switches 25b. Each first common electrode strip 24a is connected to the first signal line 201 and a corresponding scanning line 21 through a first switch 25a, and each second common electrode strip 24b is connected to the second signal line 202 and a corresponding scanning line 21 through a second switch 25b. The first signal line 201, the second signal line 202, and the plurality of switches 25a, 25b may be disposed in the non-display area of the display panel 50.

Each switch 25a, 25b includes a control terminal, a first conductive end, and a second conductive end. The control terminal of each first switch 25a is connected to a corresponding scanning line 21, the first conductive end of each first switch 25a is connected to the first signal line 201, and the second conductive end of each first switch 25a is connected to a corresponding first common electrode strip 24a. The control terminal of each second switch 25b is connected to a corresponding scanning line 21, the first conductive end of each second switch 25b is connected to the second signal line 202, and the second conductive end of each second switch 25b is connected to a corresponding second common electrode strip 24b. The plurality of switches 25a, 25b may be transistors, wherein the control terminal is the gate, one of the first conductive end and the second conductive end is the source, and the other is the drain.

Referring to FIG. 15, the viewing angle control voltage generating circuit 63 is used to output a DC reference voltage Vref, a first control voltage V3 and a second control voltage V4 to the display panel 50.

More specifically, the viewing angle control voltage generating circuit 63 includes a power chip 631, a reference voltage generating unit 632, and a control voltage generating unit 633. The reference voltage generating unit 632 is connected to the power chip 631, and the control voltage generating unit 633 is connected to the viewing angle control unit 62 and the reference voltage generating unit 632. The power chip 631 is connected to a 3.3V power supply, the reference voltage generating unit 632 is used to output the DC reference voltage Vref to the display panel 50, and the control voltage generating unit 633 is used to output the first control voltage V3 and the second control voltage V4 to the display panel 50.

The first control voltage V3 is applied to the first signal line 201, the second control voltage V4 is applied to the second signal line 202, and the DC reference voltage Vref is applied to the upper electrode 33.

Figure 17:
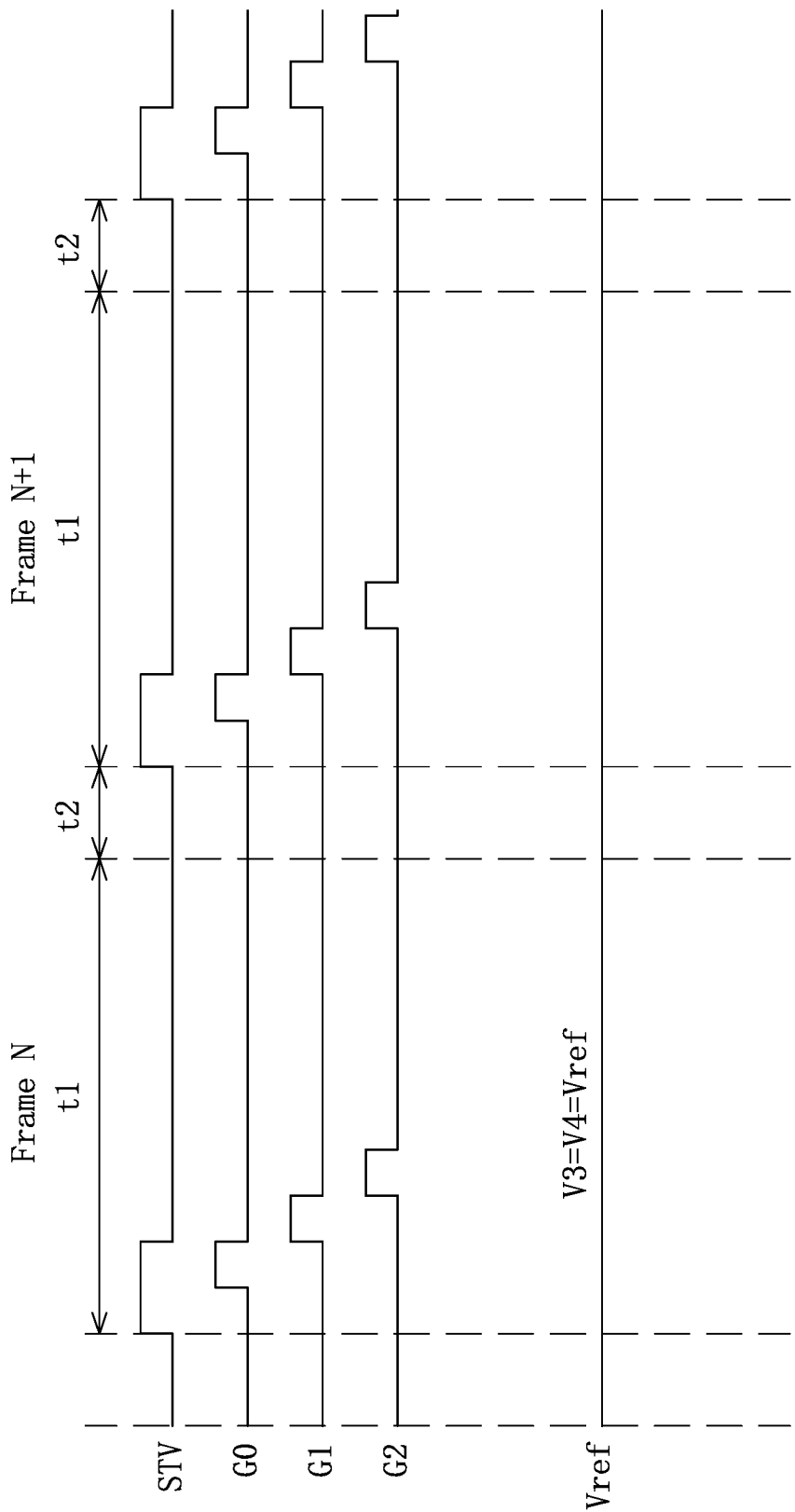
FIG. 17 is a schematic diagram of the voltage waveforms when the display panel of FIG. 16 is displayed in a wide viewing angle mode.

Referring to FIG. 17, when the display panel 50 is in the wide viewing angle display mode, the viewing angle control voltage generating circuit 63 outputs the DC reference voltage Vref, the first control voltage V3 and the second control voltage V4 to the display panel 50, wherein the first control voltage V3 and the second control voltage V4 both are DC voltages and are equal to the DC reference voltage Vref.

Figure 18:
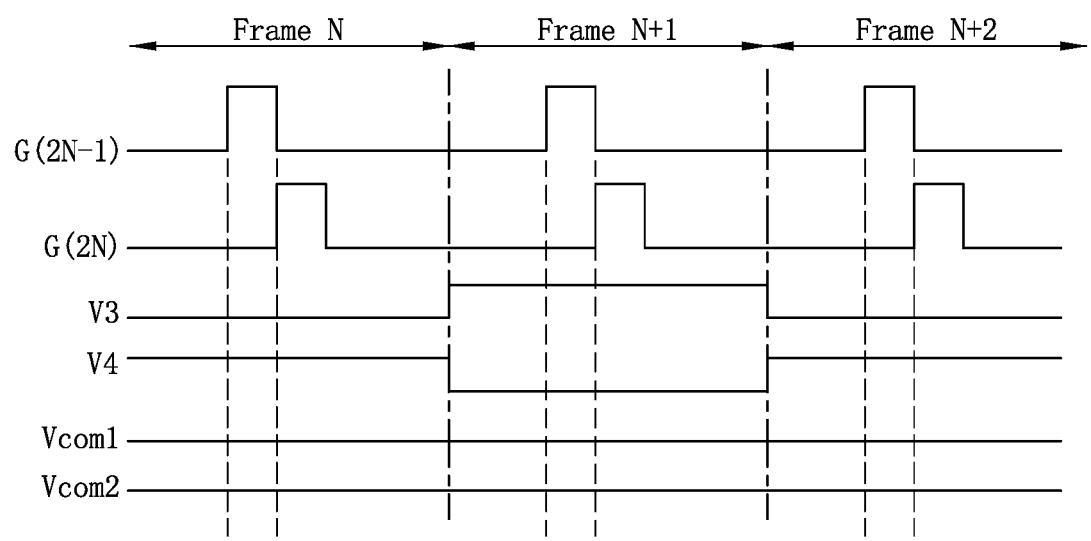
FIG. 18 is a schematic diagram of the driving waveforms when the display panel of FIG. 16 is displayed in a wide viewing angle mode.

Referring to FIG. 18, when the display panel 50 is in the wide viewing angle display mode, the first signal line 201 is applied with the first control voltage V3, and the second signal line 202 is applied with the second control voltage V4. Through the switches 25 described above, when the scanning signals are sequentially applied to the plurality of scanning lines 21, the viewing angle control voltage generating circuit 63 outputs a first common voltage Vcom1 respectively to the plurality of first common electrode strips 24a through the plurality of first switches 25a, and outputs a second common voltage Vcom2 respectively to the plurality of second common electrode strips 24b through the plurality of second switches 25b.

In FIG. 18, G(2N−1) represents the scanning signal applied to the scanning lines 21 at the odd positions, G(2N) represents the scanning signal applied to the scanning lines 21 at the even positions, Vcom1 represents the first common voltage charged on each first common electrode strip 24a, and Vcom2 represents the second common voltage charged on each second common electrode strip 24b.

When the display panel 50 is in the wide viewing angle display mode, since the first control voltage V3 and the second control voltage V4 both are DC voltages and are equal to the DC reference voltage Vref, the first common voltage Vcom1 output to the plurality of first common electrode strips 24a and the second common voltage Vcom2 output to the plurality of second common electrode strips 24b are equal to the DC reference voltage Vref, so that the voltage difference between all the common electrode strips 24 of the array substrate 20 and the upper electrode 33 of the color filter substrate 30 is zero, the tilt angle of the liquid crystal molecules in the liquid crystal layer 40 does not change and remains in the lying posture. As a result, the display panel 50 realizes wide viewing angle display.

Figure 19:
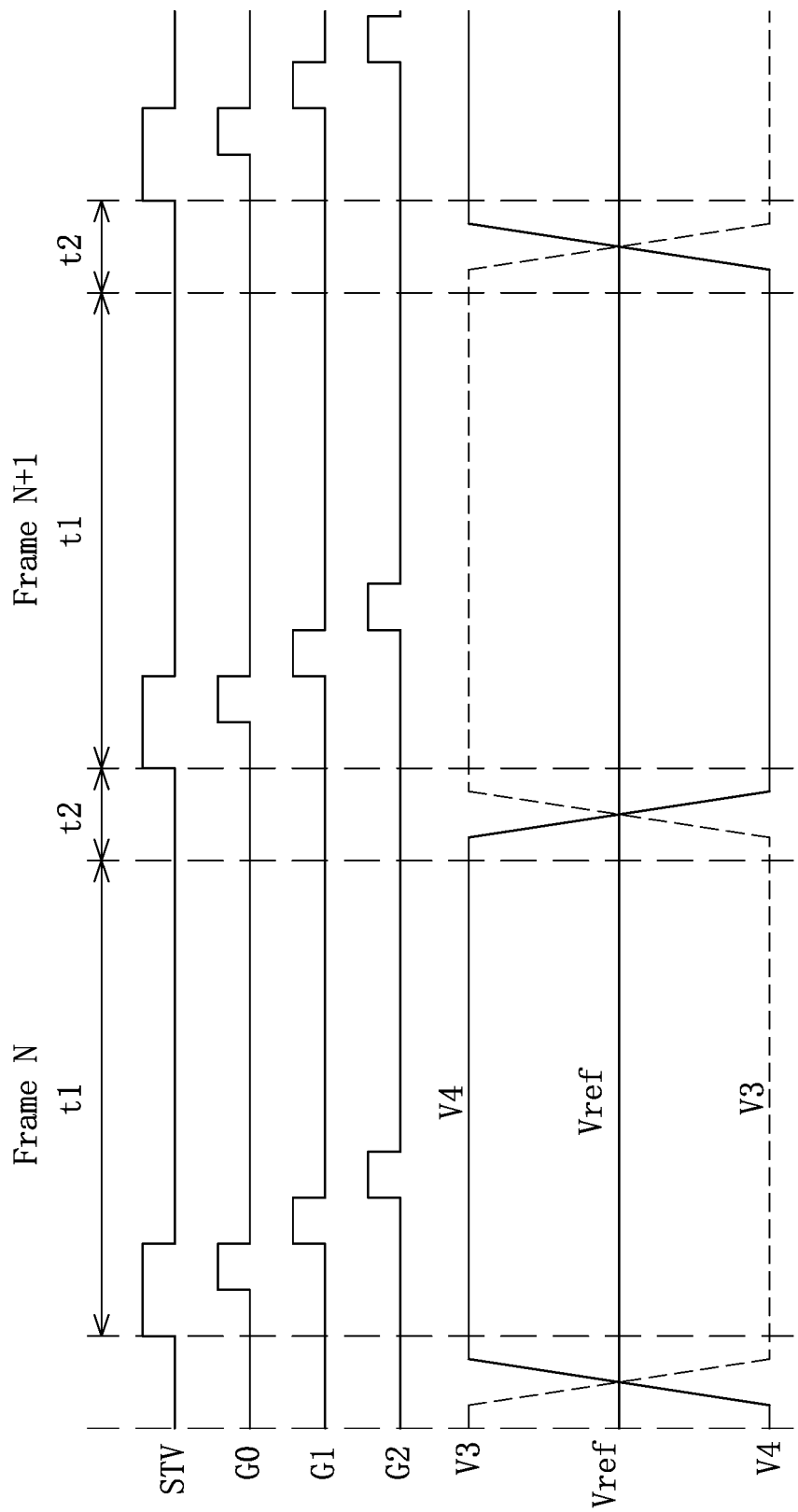
FIG. 19 is a schematic diagram of the voltage waveforms when the display panel of FIG. 16 is displayed in a narrow viewing angle mode.

Referring to FIG. 19, when the display panel 50 is in the narrow viewing angle display mode, the viewing angle control voltage generating circuit 63 outputs the DC reference voltage Vref, the first control voltage V3 and the second control voltage V4 to the display panel 50, wherein both the first control voltage V3 and the second control voltages V4 are AC voltages and are inversely symmetric with respect to the DC reference voltage Vref.

Figure 20:
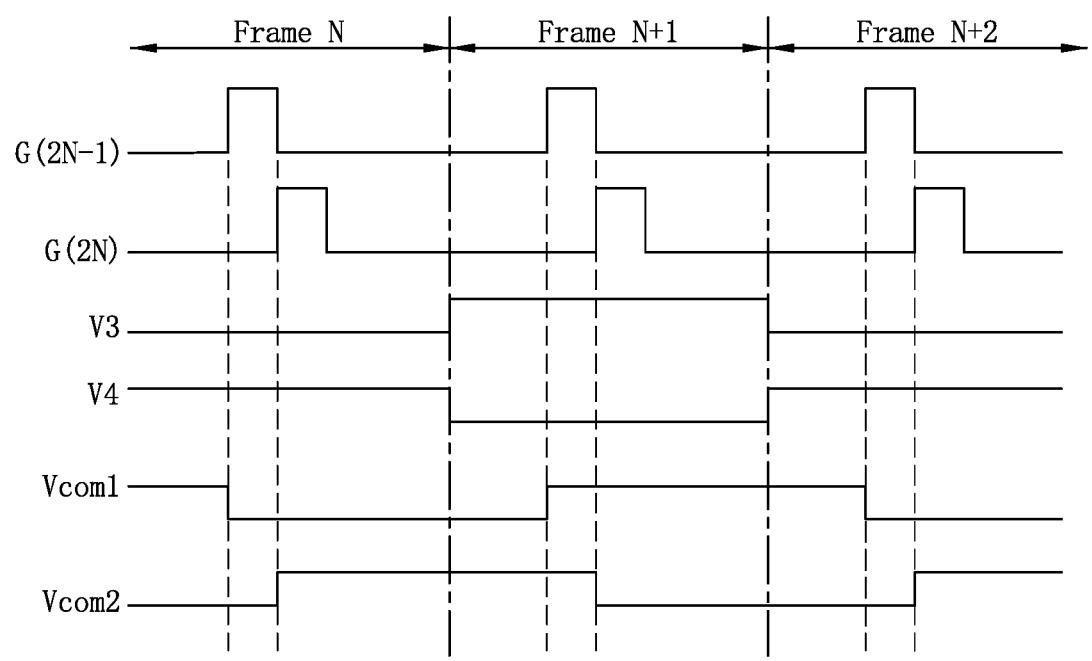
FIG. 20 is a schematic diagram of the driving waveforms when the display panel of FIG. 16 is displayed in a narrow viewing angle mode.

Referring to FIG. 20, when the display panel 50 is in the narrow viewing angle display mode, the first signal line 201 is applied with the first control voltage V3, and the second signal line 202 is applied with the second control voltage V4. Through the switches 25 described above, when the scanning signals are sequentially applied to the plurality of scanning lines 21, the viewing angle control voltage generating circuit 63 outputs a first common voltage Vcom1 to the plurality of first common electrode strips 24a through the plurality of first switches 25a, respectively, and outputs a second common voltage Vcom2 to the plurality of second common electrode strips 24b through the plurality of second switches 25b, respectively.

In FIG. 20, G(2N−1) represents the scanning signal applied to the scanning lines 21 at the odd positions, G(2N) represents the scanning signal applied to the scanning lines 21 at the even positions, Vcom1 represents the first common voltage charged on each common electrode strip 24a, and Vcom2 represents the second common voltage charged on each second common electrode strip 24b.

When the display panel 50 is in the narrow viewing angle display mode, since the first control voltage V3 and the second control voltage V4 are both AC voltages and are inversely symmetric with respect to the DC reference voltage Vref, the first common voltage Vcom1 output to the plurality of first common electrode strips 24a and the second common voltage Vcom2 output to the plurality of second common electrode strips 24b are opposite in polarity and have a large voltage difference with respect to the DC reference voltage Vref, so that there is a certain voltage difference between all the common electrode strips 24 of the array substrate 20 and the upper electrode 33 of the color filter substrate 30, and a strong vertical electric field is generated between the array substrate 20 and the color filter substrate 30 in the liquid crystal layer. The positive liquid crystal molecules will deflect under the action of the vertical electric field E, which increases the tilt angle between the liquid crystal molecules and the substrates 20, 30, and the liquid crystal molecules change from a lying posture to a tilted posture, causing the display panel 50 to appear light leakage at large observing angles, so that the contrast viewed from oblique viewing direction is reduced and the viewing angle is narrowed. As a result, the display panel 50 finally achieves a narrow viewing angle display.

It should be noted that, regardless of whether the display panel 50 is in the wide viewing angle display mode or in the narrow viewing angle display mode, the DC reference voltage Vref applied to the upper electrode 33 is constant. Therefore, by controlling the magnitudes of the first control voltage V3 and the second control voltage V4, the display panel 50 can be controlled to switch between the wide viewing angle mode and the narrow viewing angle mode. When both the first control voltage V3 and the second control voltage V4 are DC voltages and are equal to the DC reference voltage Vref, the display panel 50 is in the wide viewing angle display mode; when both the first control voltage V3 and the second control voltage V4 are AC voltages and are inversely symmetric with respect to the DC reference voltage Vref, the display panel 50 is in the narrow viewing angle display mode.

In this embodiment, the voltage for controlling the switching of the viewing angle is transferred from the viewing angle control electrode on the color filter substrate side to the common electrode on the array substrate side, and the common electrode on the array substrate 20 is cut into a plurality of independent common electrode strips 24, wherein each common electrode strip 24 is correspondingly connected to a scanning line 21 through a switch 25a, 25b. When the scanning line 21 in each row is opened, the common electrode strip 24 covering each row of pixel units P is charged with a common voltage through the switch 25a, 25b, so that each common electrode strip 24 is independently charged with voltage signal during scanning, thereby alleviating the problems of uneven display (i.e., mura) and flicker in the display panel 50 by the capacitive coupling effect, and improving the display quality. The frame frequency of the display panel 50 can be maintained at 60 Hz, the driving is simple and the power consumption is low.

Figure 21:
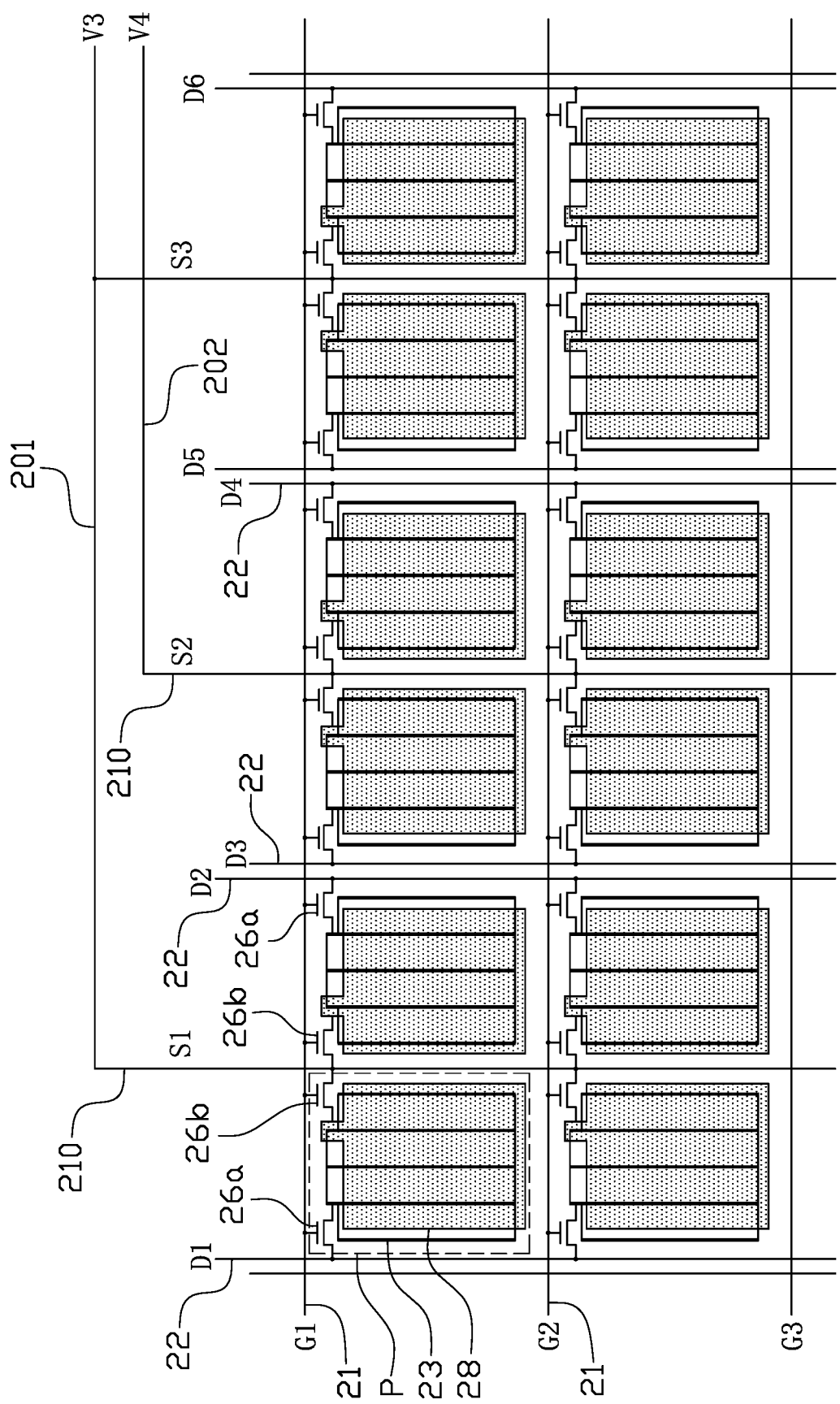
FIG. 21 is another schematic circuit diagram of the display panel of the liquid crystal display device of FIG. 15.

FIG. 21 is another schematic circuit diagram of the display panel 50 in this embodiment. Referring to FIG. 21, the array substrate 20 of the display panel 50 is provided with a plurality of scanning lines 21, a plurality of data lines 22, a plurality of common lines 210, a plurality of pixel electrodes 23, a plurality of common electrode blocks 28, a plurality of first thin film transistors 26a, a plurality of second thin film transistors 26b, a first signal line 201, and a second signal line 202.

The plurality of common lines 210 and the plurality of data lines 22 extend in the same direction. The plurality of common lines 210 and the plurality of data lines 22 are alternately arranged in the direction of the scanning line 21, wherein the plurality of data lines 22 are divided into a plurality of groups with two neighboring data lines 22 as a group, there is a common line 210 disposed between two adjacent groups of data lines 22, and a group of data lines 22 is provided between two adjacent common lines 210. Specifically, the plurality of common lines 210 and the plurality of data lines 22 may be located on the same layer on the array substrate 20, and may be simultaneously formed by the same etching process. The first signal line 201 and the second signal line 202 may be disposed in the non-display area of the display panel 50.

The plurality of scanning lines 21, the plurality of data lines 22 and the plurality of common lines 210 are insulated and intersected to define a plurality of pixel units P. Two columns of pixel units P are provided between two adjacent groups of data lines 22, and a common line 210 is provided between the two columns of pixel units P.

Figure 22:
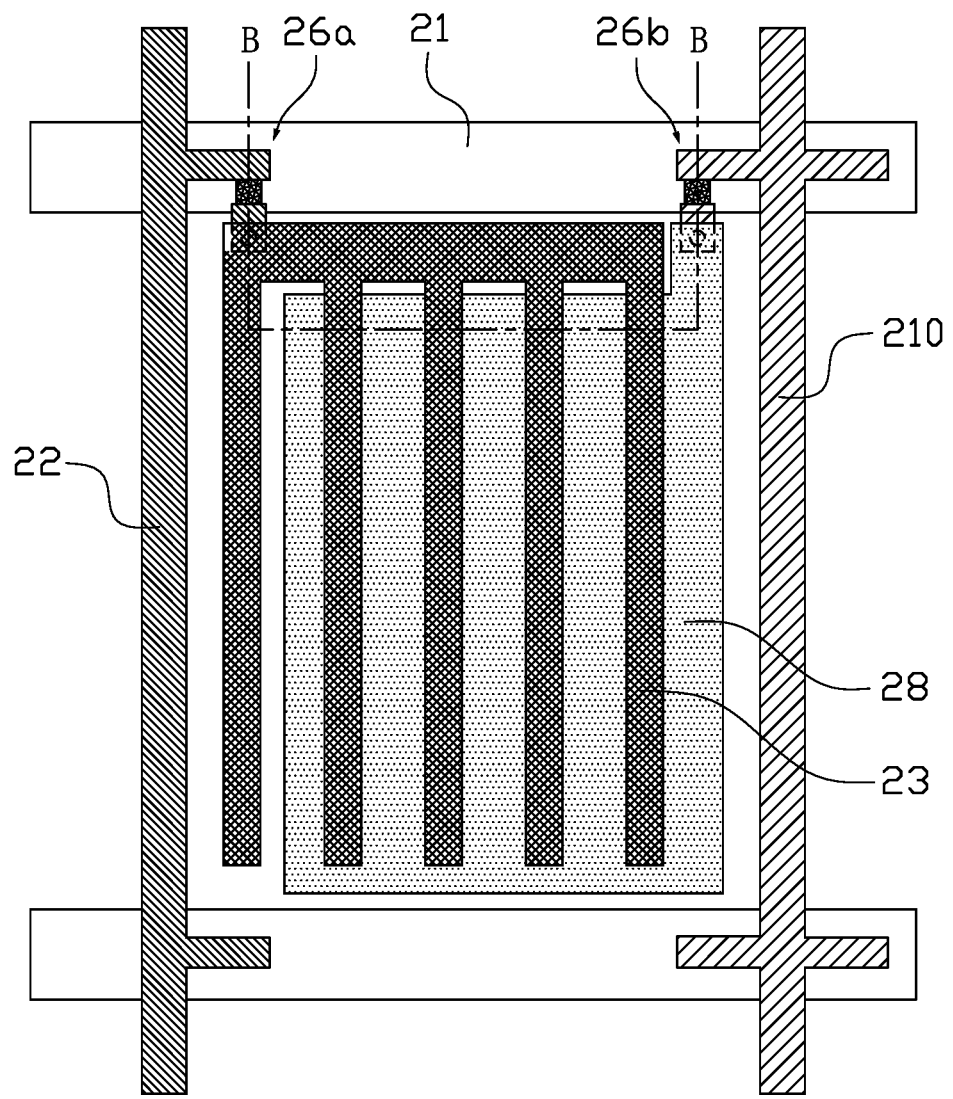
FIG. 22 is a schematic view of a single pixel unit of the display panel of FIG. 21.
Figure 23:
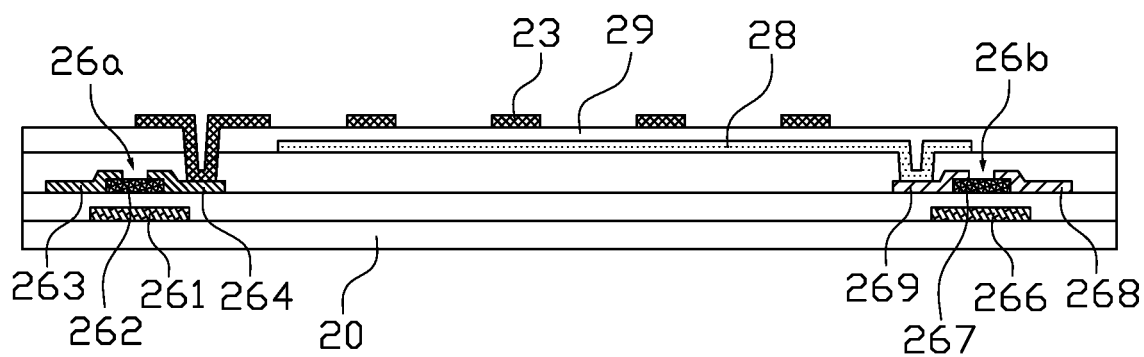
FIG. 23 is a schematic cross-sectional view taken along line B-B in FIG. 22.

Referring to FIGS. 22 and 23, a pixel electrode 23 is provided in each pixel unit P, and the pixel electrode 23 is connected, through a first thin film transistor 26a, to the scanning line 21 and the data line 22 adjacent to the first thin film transistor 26a. A common electrode block 28 is provided in each pixel unit P (that is, each common electrode block 28 correspondingly covers one pixel unit P), and each common electrode block 28 is connected, through a second thin film transistor 26b, to the scanning line 21 and the common line 210 adjacent to the second thin film transistor 26b.

Specifically, the first thin film transistor 26a includes a gate 261, an active layer 262, a source 263 and a drain 264, wherein the gate 261 is electrically connected to a corresponding scanning line 21, the source 263 is electrically connected to a corresponding data line 22, and the drain 264 is electrically connected to a corresponding pixel electrode 23.

Specifically, the second thin film transistor 26b includes a gate 266, an active layer 267, a source 268, and a drain 269, wherein the gate 266 is electrically connected to a corresponding scanning line 21, the source 268 is electrically connected to a corresponding common line 210, and the drain 269 is electrically connected to a corresponding common electrode block 28.

Referring to FIGS. 15 and 21, the viewing angle control voltage generating circuit 63 is used to output a DC reference voltage Vref, a first control voltage V3 and a second control voltage V4 to the display panel 50.

The common lines 210 at the odd positions are connected to the first signal line 201, and the common lines 210 at the even positions are connected to the second signal line 202. The first control voltage V3 is applied to the first signal line 201, the second control voltage V4 is applied to the second signal line 202, and the DC reference voltage Vref is applied to the upper electrode 33 of the color filter substrate 30.

When the display panel 50 is in the wide viewing angle display mode, the viewing angle control voltage generating circuit 63 outputs the DC reference voltage Vref, the first control voltage V3 and the second control voltage V4 to the display panel 50. The first control voltage V3 and the second control voltage V4 both are DC voltages and are equal to the DC reference voltage Vref. When the scanning signals are sequentially applied to the plurality of scanning lines 21, the viewing angle control voltage generating circuit 63 outputs a first common voltage Vcom1 to each common electrode block 28 connected to the common lines 210 at the odd positions through the second thin film transistors 26b, and outputs a second common voltage Vcom2 to each common electrode block 28 connected to the common lines 210 at the even positions through the second thin film transistor 26b.

When the display panel 50 is in the wide viewing angle mode, since the first control voltage V3 and the second control voltage V4 both are DC voltages and are equal to the DC reference voltage Vref, the first common voltage Vcom1 output to the common electrode blocks 28 connected to the common lines 210 at the odd positions and the second common voltage Vcom2 output to the common electrode blocks 28 connected to the common lines 210 at the even positions are equal to the DC reference voltage Vref, so that the voltage difference between all common electrode blocks 28 of the array substrate 20 and the upper electrode 33 of the color filter substrate 30 is zero, the tilt angle of the liquid crystal molecules in the liquid crystal layer 40 does not change and remains in the lying posture. As a result, the display panel 50 realizes wide viewing angle display.

When the display panel 50 is in the narrow viewing angle display mode, the viewing angle control voltage generating circuit 63 outputs the DC reference voltage Vref, the first control voltage V3 and the second control voltage V4 to the display panel 50, wherein both the first control voltage V3 and the second control voltage V4 are AC voltages and are inversely symmetric with respect to the DC reference voltage Vref. When the scanning signals are sequentially applied to the plurality of scanning lines 21, the viewing angle control voltage generating circuit 63 outputs a first common voltage Vcom1 to each common electrode block 28 connected to the common lines 210 at the odd positions through the second thin film transistor 26b, and outputs a second common voltage Vcom2 to each common electrode block 28 connected to the common lines 210 at the even positions through the second thin film transistor 26b.

When the display panel 50 is in the narrow viewing angle display mode, since both the first control voltage V3 and the second control voltage V4 are AC voltages and are inversely symmetric with respect to the DC reference voltage Vref, the first common voltage Vcom1 output to each common electrode block 28 connected to the common lines 210 at the odd positions and the second common voltage Vcom2 output to each common electrode block 28 connected to the common lines 210 at the even positions are opposite in polarity and have a large voltage difference with respect to the DC reference voltage Vref, so that there is a certain voltage difference between all common electrode blocks 28 of the array substrate 20 and the upper electrode 33 of the color filter substrate 30, and a strong vertical electric field is generated between the array substrate 20 and the color filter substrate 30 in the liquid crystal layer. The positive liquid crystal molecules will deflect under the action of the vertical electric field E, which increases the tilt angle between the liquid crystal molecules and the substrates 20, 30, and the liquid crystal molecules change from a lying posture to a tilted posture, causing the display panel 50 to appear light leakage at large observing angles, so that the contrast viewed from oblique viewing direction is reduced and the viewing angle is narrowed. As a result, the display panel 50 finally achieves a narrow viewing angle display.

Figure 24:
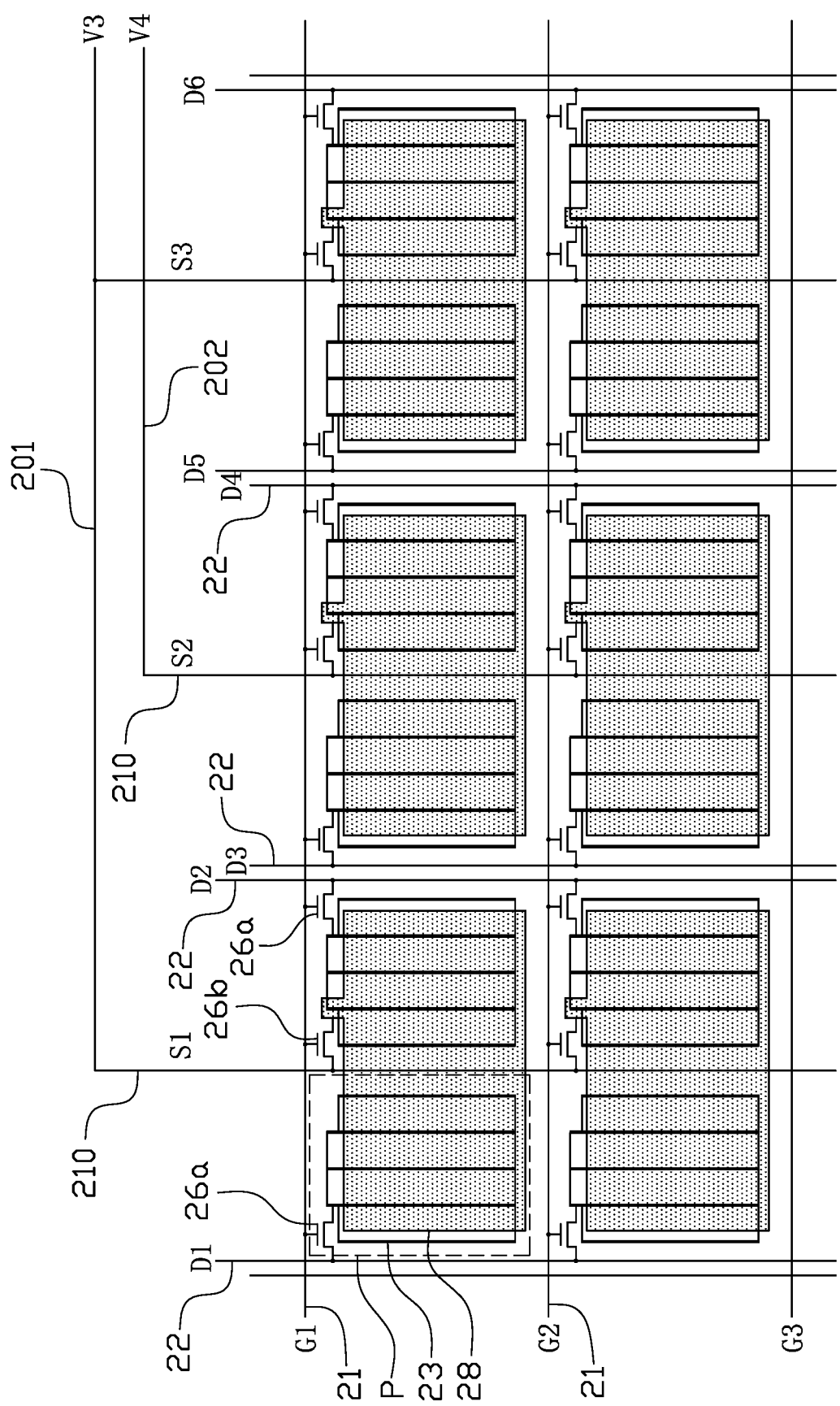
FIG. 24 is a further schematic circuit diagram of the display panel of the liquid crystal display device of FIG. 15.

FIG. 24 is another schematic circuit diagram of the display panel in this embodiment. The difference between the display panel shown in FIG. 24 and the display panel shown in FIG. 21 is only that a common electrode block 28 is provided in two consecutive pixel units P between two adjacent groups of data lines 22 (that is, each common electrode block 28 simultaneously covers two consecutive pixel units P).

In this embodiment, the voltage for controlling the switching of the viewing angle is transferred from the viewing angle control electrode on the color filter substrate side to the common electrode on the array substrate side, and the common electrode on the array substrate 20 is cut into a plurality of independent common electrode blocks 28, wherein each common electrode block 28 is correspondingly connected to a scanning line 21 through a second thin film transistor 26b. When the scanning line 21 in each row is opened, the common electrode blocks 28 covering the pixel units P are charged with a common voltage respectively through the second thin film transistors 26b, so that each common electrode block 28 is independently charged with voltage signal during scanning, thereby alleviating the problems of uneven display (i.e., mura) and flicker in the display panel 50 due to the capacitive coupling effect, and improving the display quality. The frame frequency of the display panel 50 can be maintained at 60 Hz, which make the driving simple and the power consumption low.

The above-mentioned embodiments are only examples of the present invention, and are not intended to limit the implementation and the scope of the present invention. Any equivalent changes and modifications made in accordance with the content described above should be included in the scope of the present invention.

What is claimed is:

1. A liquid crystal display device comprising a display panel with a switchable viewing angle, and a driving circuit for driving the display panel, wherein the driving circuit comprises a display control unit, a viewing angle control unit, a viewing angle control voltage generating circuit, a gamma voltage generating circuit, a source driver and a gate driver;

the viewing angle control unit is connected to the display control unit, the viewing angle control voltage generating circuit and the gamma voltage generating circuit, the source driver is connected to the display control unit and the gamma voltage generating circuit, the gate driver is connected to the display control unit;

the viewing angle control unit is used to receive a viewing angle switching signal, the gamma voltage generating circuit is used to output gamma voltages to the source driver, the viewing angle control voltage generating circuit is used to output a DC reference voltage, a first AC control voltage, a second AC control voltage, a first DC voltage and a second DC voltage to the display panel;

when the display panel is in a wide viewing angle display mode, the gamma voltage generating circuit outputs a first group of gamma voltages to the source driver, the first AC control voltage and the second AC control voltage are inversely symmetric with respect to the DC reference voltage, and the first DC voltage and the second DC voltage are both equal to the DC reference voltage;

when the display panel is in a narrow viewing angle display mode, the gamma voltage generating circuit outputs a second group of gamma voltages to the source driver, the first AC control voltage and the second AC control voltage are inversely symmetric with respect to the DC reference voltage, the first DC voltage is lower than the DC reference voltage, and the second DC voltage is higher than the DC reference voltage.

2. The liquid crystal display device according to claim 1, wherein the viewing angle control voltage generating circuit comprises a power chip, a reference voltage generating unit and a control voltage generating unit;

the reference voltage generating unit is connected to the power chip, the control voltage generating unit is connected to the viewing angle control unit and the reference voltage generating unit;

the reference voltage generating unit is used to output the DC reference voltage to the display panel, and the control voltage generating unit is used to output the first AC control voltage, the second AC control voltage, the first DC voltage and the second DC voltage to the display panel.

3. The liquid crystal display device according to claim 1, wherein the display panel comprises an array substrate, a color filter substrate disposed opposite to the array substrate, and a liquid crystal layer disposed between the array substrate and the color filter substrate;

the array substrate is provided with a plurality of scanning lines, a plurality of data lines, a plurality of common electrode strips, a first signal line, a second signal line, a third signal line, a fourth signal line and a plurality of selectors;

each common electrode strip extends in the direction of the scanning line, the plurality of common electrode strips include a plurality of first common electrode strips and a plurality of second common electrode strips, the plurality of first common electrode strips and the plurality of second common electrode strips are alternately arranged in the direction of the data line;

the plurality of selectors include a plurality of first selectors and a plurality of second selectors, each first common electrode strip is connected to the first signal line, the second signal line, the third signal line, the fourth signal line and a corresponding scanning line through a first selector, each second common electrode strip is connected to the first signal line, the second signal line, the third signal line, the fourth signal line and a corresponding scanning line through a second selector;

the first AC control voltage is applied to the first signal line, the second AC control voltage is applied to the second signal line, the first DC voltage is applied to the third signal line, the second DC voltage is applied to the fourth signal line;

the color filter substrate is provided with an upper electrode, and the DC reference voltage is applied to the upper electrode.

4. The liquid crystal display device according to claim 3, wherein each selector comprises a first switching element, a second switching element, a third switching element, a fourth switching element, a first storage capacitor, and a second storage capacitor;

a control terminal of the first switching element is connected to a control terminal of the second switching element and connected to a corresponding scanning line;

a first conductive end of the first switching element is connected to one of the first signal line and the second signal line, a first conductive end of the second switching element is connected to the other one of the first signal line and the second signal line;

a second conductive end of the first switching element is connected to a control terminal of the third switching element and connected to a first node, a second conductive end of the second switching element is connected to a control terminal of the fourth switching element and connected to a second node;

a first conductive end of the third switching element is connected to the third signal line, a first conductive end of the fourth switching element is connected to the fourth signal line;

a second conductive end of the third switching element is connected to a second conductive end of the fourth switching element and connected to a corresponding common electrode strip;

the first storage capacitor is connected to the first node, and the second storage capacitor is connected to the second node.

5. The liquid crystal display device according to claim 4, wherein for each first selector, the first conductive end of the first switching element is connected to the first signal line, and the first conductive end of the second switching element is connected to the second signal line;

for each second selector, the first conductive end of the first switching element is connected to the second signal line, and the first conductive end of the second switching element is connected to the first signal line.

6. The liquid crystal display device according to claim 3, wherein on the array substrate, the plurality of scanning lines and the plurality of data lines are insulated and intersected to define a plurality of pixel units arranged in an array, each common electrode strip covers a corresponding row of pixel units.

7. The liquid crystal display device according to claim 6, wherein the plurality of first common electrode strips respectively cover the pixel units in odd rows, the plurality of second common electrode strips respectively cover the pixel units in even rows;

the pixel units in each row are alternately connected to the two scanning lines on the upper and lower sides of this row of pixel units, the pixel units in each column are alternately connected to the two data lines on the left and right sides of this column of pixel units;

the pixel units in each odd row are only connected to the data lines at the odd positions, and the pixel units in each even row are only connected to the data lines at the even positions.

8. A liquid crystal display device comprising a display panel with a switchable viewing angle, and a driving circuit for driving the display panel, wherein the driving circuit comprises a display control unit, a viewing angle control unit, a viewing angle control voltage generating circuit, a gamma voltage generating circuit, a source driver and a gate driver;

the viewing angle control unit is connected to the display control unit, the viewing angle control voltage generating circuit and the gamma voltage generating circuit, the source driver is connected to the display control unit and the gamma voltage generating circuit, the gate driver is connected to the display control unit;

the viewing angle control unit is used to receive a viewing angle switching signal, the gamma voltage generating circuit is used to output gamma voltages to the source driver, the viewing angle control voltage generating circuit is used to output a DC reference voltage, a first control voltage and a second control voltage to the display panel;

when the display panel is in a wide viewing angle display mode, the gamma voltage generating circuit outputs a first group of gamma voltages to the source driver, both the first control voltage and the second control voltage are DC voltages and are equal to the DC reference voltage;

when the display panel is in a narrow viewing angle display mode, the gamma voltage generating circuit outputs a second group of gamma voltages to the source driver, both the first control voltage and the second control voltage are AC voltages and are inversely symmetric with respect to the DC reference voltage.

9. The liquid crystal display device according to claim 8, wherein the viewing angle control voltage generating circuit comprises a power chip, a reference voltage generating unit and a control voltage generating unit;

the reference voltage generating unit is connected to the power chip, the control voltage generating unit is connected to the viewing angle control unit and the reference voltage generating unit;

the reference voltage generating unit is used to output the DC reference voltage to the display panel, and the control voltage generating unit is used to output the first control voltage and the second control voltage to the display panel.

10. The liquid crystal display device according to claim 8, wherein the display panel comprises an array substrate, a color filter substrate disposed opposite to the array substrate, and a liquid crystal layer disposed between the array substrate and the color filter substrate;

the array substrate is provided with a plurality of scanning lines, a plurality of data lines, a plurality of common electrode strips, a first signal line, a second signal line and a plurality of switches;

each common electrode strip extends in the direction of the scanning line, the plurality of common electrode strips include a plurality of first common electrode strips and a plurality of second common electrode strips, the plurality of first common electrode strips and the plurality of second common electrode strips are alternately arranged in the direction of the data line;

the plurality of switches include a plurality of first switches and a plurality of second switches, each first common electrode strip is connected to the first signal line and a corresponding scanning line through a first switch, each second common electrode strip is connected to the second signal line and a corresponding scanning line through a second switch;

the first control voltage is applied to the first signal line, the second control voltage is applied to the second signal line;

the color filter substrate is provided with an upper electrode, and the DC reference voltage is applied to the upper electrode.

11. The liquid crystal display device according to claim 10, wherein a control terminal of each first switch is connected to a corresponding scanning line, a first conductive end of each first switch is connected to the first signal line, a second conductive end of each first switch is connected to a corresponding first common electrode strip;

a control terminal of each second switch is connected to a corresponding scanning line, a first conductive end of each second switch is connected to the second signal line, a second conductive end of each second switch is connected to a corresponding second common electrode strip.

12. The liquid crystal display device according to claim 10, wherein on the array substrate, the plurality of scanning lines and the plurality of data lines are insulated and intersected to define a plurality of pixel units arranged in an array, each common electrode strip covers a corresponding row of pixel units.

13. The liquid crystal display device according to claim 12, wherein the plurality of first common electrode strips respectively cover the pixel units in odd rows, the plurality of second common electrode strips respectively cover the pixel units in even rows;

the pixel units in each row are alternately connected to the two scanning lines on the upper and lower sides of this row of pixel units, the pixel units in each column are alternately connected to the two data lines on the left and right sides of this column of pixel units;

the pixel units in each odd row are only connected to the data lines at the odd positions, and the pixel units in each even row are only connected to the data lines at the even positions.

14. The liquid crystal display device according to claim 8, wherein the display panel comprises an array substrate, a color filter substrate disposed opposite to the array substrate, and a liquid crystal layer disposed between the array substrate and the color filter substrate;

the array substrate is provided with a plurality of scanning lines, a plurality of data lines, a plurality of pixel electrodes, a plurality of first thin film transistors, a plurality of common lines, a plurality of common electrode blocks, a plurality of second thin film transistors, a first signal line and a second signal line;

the plurality of scanning lines, the plurality of data lines and the plurality of common lines are insulated and intersected to define a plurality of pixel units arranged in an array, a pixel electrode is provided in each pixel unit, the pixel electrode is connected, through a first thin film transistor, to the scanning line and the data line adjacent to the first thin film transistor;

a common electrode block is provided in each pixel unit or in every two adjacent pixel units, the common electrode block is connected, through a second thin film transistor, to the scanning line and the common line adjacent to the second thin film transistor;

the common lines at the odd positions are connected to the first signal line, the common lines at the even positions are connected to the second signal line;

the first control voltage is applied to the first signal line, the second control voltage is applied to the second signal line;

the color filter substrate is provided with an upper electrode, and the DC reference voltage is applied to the upper electrode.

15. The liquid crystal display device according to claim 14, wherein the plurality of common lines and the plurality of data lines extend in the same direction, and the plurality of common lines and the plurality of data lines are alternately arranged in the direction of the scanning line.

* * * * *